United States Patent
Shei et al.

(10) Patent No.: US 8,895,902 B2
(45) Date of Patent: Nov. 25, 2014

(54) OVEN FOR HEATING FOOD

(71) Applicant: Duke Manufacturing Co., St. Louis, MO (US)

(72) Inventors: Steven M. Shei, Fort Wayne, IN (US); Dennis R. Headberg, St. Augustine, FL (US); Clement J. Luebke, Essex Junction, VT (US)

(73) Assignee: Duke Manufacturing Co., St. Louis, MO (US)

( * ) Notice: Subject to any disclaimer, the term of this patent is extended or adjusted under 35 U.S.C. 154(b) by 0 days.

(21) Appl. No.: 13/621,629

(22) Filed: Sep. 17, 2012

(65) Prior Publication Data

US 2013/0175253 A1    Jul. 11, 2013

Related U.S. Application Data

(63) Continuation of application No. PCT/US2011/028786, filed on Mar. 17, 2011.

(60) Provisional application No. 61/314,875, filed on Mar. 17, 2010.

(51) Int. Cl.

| | | |
|---|---|---|
| *F27D 7/04* | (2006.01) | |
| *A21B 1/26* | (2006.01) | |
| *A21B 3/02* | (2006.01) | |
| *A21B 3/04* | (2006.01) | |
| *A47J 39/00* | (2006.01) | |
| *A21B 1/24* | (2006.01) | |

(52) U.S. Cl.
CPC .............. *A47J 39/003* (2013.01); *A21B 1/245* (2013.01)
USPC ............. 219/400; 219/394; 99/474; 126/21 A

(58) Field of Classification Search
None
See application file for complete search history.

(56) References Cited

U.S. PATENT DOCUMENTS

| 2,894,604 A | 7/1959 | McMillan |
| 3,292,525 A | 12/1966 | Jensen |

(Continued)

FOREIGN PATENT DOCUMENTS

| BE | 388518 | 5/1932 |
| EP | 0373446 A2 | 1/1989 |

(Continued)

OTHER PUBLICATIONS

International Search Report for PCT/US2011/028786 mailed Oct. 20, 2011, 3 pgs.

(Continued)

*Primary Examiner* — Joseph M Pelham
(74) *Attorney, Agent, or Firm* — Senniger Powers LLP

(57) ABSTRACT

An oven for heating food is disclosed. The oven has at least one heating compartment with a left side wall, a right side wall, a back wall, a top wall, a bottom wall, and an open front, without a door, in open communication with a surrounding environment outside the oven. Gas flow openings are provided in the left and right side walls. The oven includes a blower for blowing gas through the gas flow openings into the heating compartment, and a heater for heating gas blowing into the heating compartment through the openings. In certain embodiments, the gas flow openings are configured such that substantially all of the gas blowing into the heating compartment is directed generally away from the open front of the compartment.

19 Claims, 27 Drawing Sheets

(56) References Cited

U.S. PATENT DOCUMENTS

| | | | |
|---|---|---|---|
| 3,861,378 A | 1/1975 | Rhoads et al. | |
| 3,911,248 A | 10/1975 | Buday et al. | |
| 4,030,476 A | 6/1977 | Hock | |
| 4,062,983 A | 12/1977 | Roderick | |
| 4,132,216 A | 1/1979 | Guibert | |
| 4,237,623 A | 12/1980 | Timm et al. | |
| 4,327,279 A | 4/1982 | Guibert | |
| 4,375,213 A | 3/1983 | Kemp et al. | |
| 4,381,442 A | 4/1983 | Guibert | |
| 4,381,443 A | 4/1983 | Guibert | |
| 4,395,233 A | 7/1983 | Smith et al. | |
| 4,437,396 A | 3/1984 | Plattner et al. | |
| 4,455,478 A | 6/1984 | Guibert | |
| 4,499,818 A | 2/1985 | Strong | |
| 4,722,683 A * | 2/1988 | Royer | 432/152 |
| 4,726,285 A | 2/1988 | Kelley | |
| 4,834,470 A | 5/1989 | Pinnow et al. | |
| 4,865,864 A | 9/1989 | Rijswijck | |
| 4,869,155 A * | 9/1989 | Grieve | 454/309 |
| 4,892,030 A | 1/1990 | Grieve | |
| 4,928,663 A | 5/1990 | Nevin et al. | |
| 4,972,824 A | 11/1990 | Luebke et al. | |
| 5,077,065 A | 12/1991 | Ash et al. | |
| 5,172,328 A | 12/1992 | Cahlander et al. | |
| 5,189,944 A | 3/1993 | Rasmussen et al. | |
| 5,276,309 A | 1/1994 | Hasse et al. | |
| 5,309,981 A * | 5/1994 | Binder | 165/64 |
| 5,315,919 A | 5/1994 | Hoeberigs | |
| 5,375,511 A | 12/1994 | Huie et al. | |
| 5,400,838 A | 3/1995 | Schjerven et al. | |
| 5,434,390 A | 7/1995 | McKee et al. | |
| 5,532,456 A | 7/1996 | Smith et al. | |
| 5,693,242 A * | 12/1997 | Sanchez | 219/400 |
| 5,715,745 A | 2/1998 | Blanton, Jr. et al. | |
| 5,816,234 A | 10/1998 | Vasan | |
| 5,900,173 A | 5/1999 | Robards, Jr. | |
| 5,934,573 A | 8/1999 | Weterrings et al. | |
| 5,947,012 A | 9/1999 | Ewald et al. | |
| 6,031,208 A | 2/2000 | Witt et al. | |
| 6,073,547 A | 6/2000 | Westbrooks, Jr. et al. | |
| 6,114,659 A | 9/2000 | Finck et al. | |
| 6,119,587 A | 9/2000 | Ewald et al. | |
| 6,261,621 B1 | 7/2001 | Stanger et al. | |
| 6,262,394 B1 | 7/2001 | Shei et al. | |
| 6,323,464 B1 | 11/2001 | Cohn | |
| 6,454,176 B1 | 9/2002 | Burkett et al. | |
| 6,575,154 B1 | 6/2003 | Freeman, Jr. et al. | |
| 6,870,136 B1 * | 3/2005 | Majordy | 219/400 |
| 6,874,495 B2 | 4/2005 | McFadden | |
| 7,012,218 B2 | 3/2006 | Flinn | |
| 7,089,850 B2 | 8/2006 | Lee et al. | |
| 7,105,779 B2 | 9/2006 | Shei | |
| 7,119,306 B2 * | 10/2006 | Boryca et al. | 219/385 |
| 7,166,821 B2 | 1/2007 | Adamski | |
| 7,220,946 B2 * | 5/2007 | Majchrzak et al. | 219/401 |
| 7,227,102 B2 | 6/2007 | Shei | |
| 7,296,510 B2 * | 11/2007 | Ohtsuka et al. | 99/476 |
| 7,303,776 B2 | 12/2007 | Sus et al. | |
| 7,357,131 B2 | 4/2008 | Moreth, III et al. | |
| 7,360,533 B2 * | 4/2008 | McFadden | 126/21 A |
| 7,441,388 B2 | 10/2008 | Sus et al. | |
| 7,650,833 B2 | 1/2010 | Pardoe et al. | |
| 7,819,347 B2 | 10/2010 | Antal, Sr. | |
| 7,824,721 B2 | 11/2010 | Sus et al. | |
| 7,891,289 B2 | 2/2011 | Day et al. | |
| 7,905,173 B2 | 3/2011 | Sus et al. | |
| 8,051,795 B2 | 11/2011 | Dorsten et al. | |
| 8,063,342 B2 * | 11/2011 | Hines, Jr. | 219/400 |
| 8,071,918 B2 | 12/2011 | Veltrop et al. | |
| 8,076,616 B2 | 12/2011 | Stanger | |
| 8,096,231 B2 | 1/2012 | Veltrop et al. | |
| 8,134,101 B2 * | 3/2012 | Majchrzak | 219/400 |
| 8,181,827 B2 | 5/2012 | Long et al. | |
| 8,297,270 B2 | 10/2012 | McFadden | |
| 8,357,412 B2 | 1/2013 | Dorsten et al. | |
| 8,362,404 B2 * | 1/2013 | Emerich et al. | 219/400 |
| 8,437,627 B1 | 5/2013 | Magner | |
| 2002/0005686 A1 * | 1/2002 | Nuttall et al. | 312/236 |
| 2005/0211109 A1 * | 9/2005 | Majchrzak et al. | 99/468 |
| 2008/0063767 A1 | 3/2008 | Sus et al. | |
| 2008/0173649 A1 | 7/2008 | Sus et al. | |
| 2009/0045185 A1 | 2/2009 | Schroeder et al. | |
| 2009/0057293 A1 | 3/2009 | Schroeder et al. | |
| 2009/0114636 A1 | 5/2009 | Veltrop et al. | |
| 2009/0202692 A1 | 8/2009 | Chun | |
| 2011/0005409 A1 * | 1/2011 | Majchrzak | 99/468 |
| 2011/0210114 A1 | 9/2011 | Lauer | |
| 2011/0223300 A1 | 9/2011 | Purgatorio | |
| 2012/0009309 A1 | 1/2012 | Dorsten et al. | |

FOREIGN PATENT DOCUMENTS

| | | |
|---|---|---|
| EP | 0103526 B1 | 5/1989 |
| EP | 0694260 A1 | 6/1995 |
| EP | 0482255 B1 | 8/1995 |
| EP | 0728433 A1 | 8/1996 |
| EP | 0755170 A2 | 1/1997 |
| EP | 0995387 A1 | 4/2000 |
| EP | 0905452 B1 | 12/2003 |
| EP | 1171019 B1 | 7/2004 |
| EP | 1739362 A2 | 6/2006 |
| GB | 191103083 A | 10/1911 |
| WO | 2005044069 A1 | 5/2005 |
| WO | 2008027433 A2 | 3/2008 |
| WO | 2010027922 A1 | 3/2010 |

OTHER PUBLICATIONS

Written Opinion for PCT/US2011/028786 mailed Oct. 20, 2011, 5 pgs.

Pitco Frialator, Inc. Brochure, Crisp N' Hold Food Station, Jan. 2013, 2 pages.

Standex Food Service Equipment Group, BKI Hot-N Crispy Fry Warmer, Feb. 2007, 2 pages.

Meister Cook, LLC Brochure, Fried Food Holder (FH 23-75) with Indicator LED, 1 page.

Hatco GLO-RAY Fry Holding Stations Brochure, Sep. 2011, 2 pages.

Carter-Hoffmann CNH Series Crisp 'N Hold Crispy Food Stations (with forced air heating system) Brochure, 2 pages.

Marshall ThermoGlo Model CM2A Fried Foods Dump Station Brochure, 1999, 2 pages.

Merco Parts & Service Manual, Fried Food Holding Station 27000 Series, 40 pages.

Merco Fried Food Holding Specification Sheet, 2009, 4 pages.

European Search Report for European Patent Application No. 11756983 mailed Jul. 3, 2013, 13 pgs.

* cited by examiner

OVEN FOR HEATING FOOD

CROSS-REFERENCE TO RELATED APPLICATION

This application is a continuation application claiming priority to PCT Application No. PCT/US2011/028786 filed Mar. 17, 2011, the entirety of which is hereby incorporated by reference.

FIELD OF THE INVENTION

The present invention generally relates to food serving equipment, and more particularly to an oven for heating food.

BACKGROUND OF THE INVENTION

In one embodiment, this invention is directed to an oven which uses hot gas to maintain pre-cooked food at proper temperatures before serving. This type of equipment is often referred to using such terms as a holding oven, or a holding unit, or a food warmer. Such equipment is used in the fast food service industry to heat food prior to serving it.

SUMMARY OF THE INVENTION

In one embodiment, this invention is directed to an oven for heating food, comprising a housing having a left side, a right side, a top, a bottom, a back, and a front. The housing defines an oven cavity comprising at least one heating compartment for heating food placed in the compartment. The heating compartment has a left side wall, a right side wall, a back wall, a top wall, a bottom wall, and an open front, without a door, in open communication with a surrounding environment outside the oven. Gas flow openings are provided in the left and right side walls. The oven includes a blower for blowing gas through the gas flow openings into the heating compartment, and a heater for heating gas blowing into the heating compartment through the openings. The gas flow openings are configured such that substantially all of the gas blowing into the heating compartment is directed generally away from the open front of the compartment.

In another embodiment, this invention is directed to an oven for heating food, comprising a housing having a left side, a right side, a top, a bottom, a back, and a front. The housing defines an oven cavity comprising at least one heating compartment for heating food placed in the compartment. The heating compartment has a left side wall, a right side wall, a back wall, a top wall, a bottom wall, and an open front, without a door, in open communication with a surrounding environment outside the oven. Gas flow openings are provided in the left and right side walls. The oven includes a blower for blowing gas through the gas flow openings into the heating compartment, and a heater for heating gas blowing into the heating compartment through the openings. A movable air deflector at the top of the open front of the heating compartment is provided for deflecting heated air into the heating compartment. The air deflector is movable between a lowered operative position and a raised position. In its lowered position, the air deflector extends down over only an upper portion of the open front of the heating compartment.

In another embodiment, this invention is directed to an oven for heating food, comprising a housing having a left side, a right side, a top, a bottom, a back, and a front. The housing defines an oven cavity comprising at least one heating compartment for heating food placed in the compartment. The heating compartment has a left side wall, a right side wall, a back wall, a top wall, a bottom wall, and an open front, without a door, in open communication with a surrounding environment outside the oven. Gas flow openings are provided in the left and right side walls. The oven includes a blower for blowing gas through the gas flow openings into the heating compartment, and a heater for heating gas blowing into the heating compartment through the openings. The heating compartment has a side-to-side width of no more than about 14 inches. A gas dead zone at the front of the heating compartment extends substantially an entire height of the compartment and a full side-to-side width of the compartment and having a dimension in front-to-rear direction of at least 2 in. The gas dead zone is substantially free of moving gas generated by the oven during operation of the oven to heat food in the heating compartment.

In yet another embodiment, this invention is directed to an oven for heating food, comprising a housing having a left side, a right side, a top, a bottom, a back, and a front. The oven includes an oven cavity inside the housing comprising at least one heating compartment for heating food placed in the compartment. The heating compartment has a left side wall, a right side wall, a back wall, and an open front, without a door, in open communication with a surrounding environment outside the oven. Gas flow openings are provided in at least one of the left and right side walls. A blower is provided for blowing gas through said gas flow openings in at least one of the left and right side walls into the heating compartment. A heater is provided for heating gas blowing into the heating compartment through said gas flow openings in at least one of the left and right side walls. Gas flow openings are provided in the back wall of the heating compartment. Gas blows into the heating compartment via said gas flow openings in at least one of the left and right side walls, and gas exhausts from the heating compartment via said gas flow openings in the back wall of the heating compartment.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
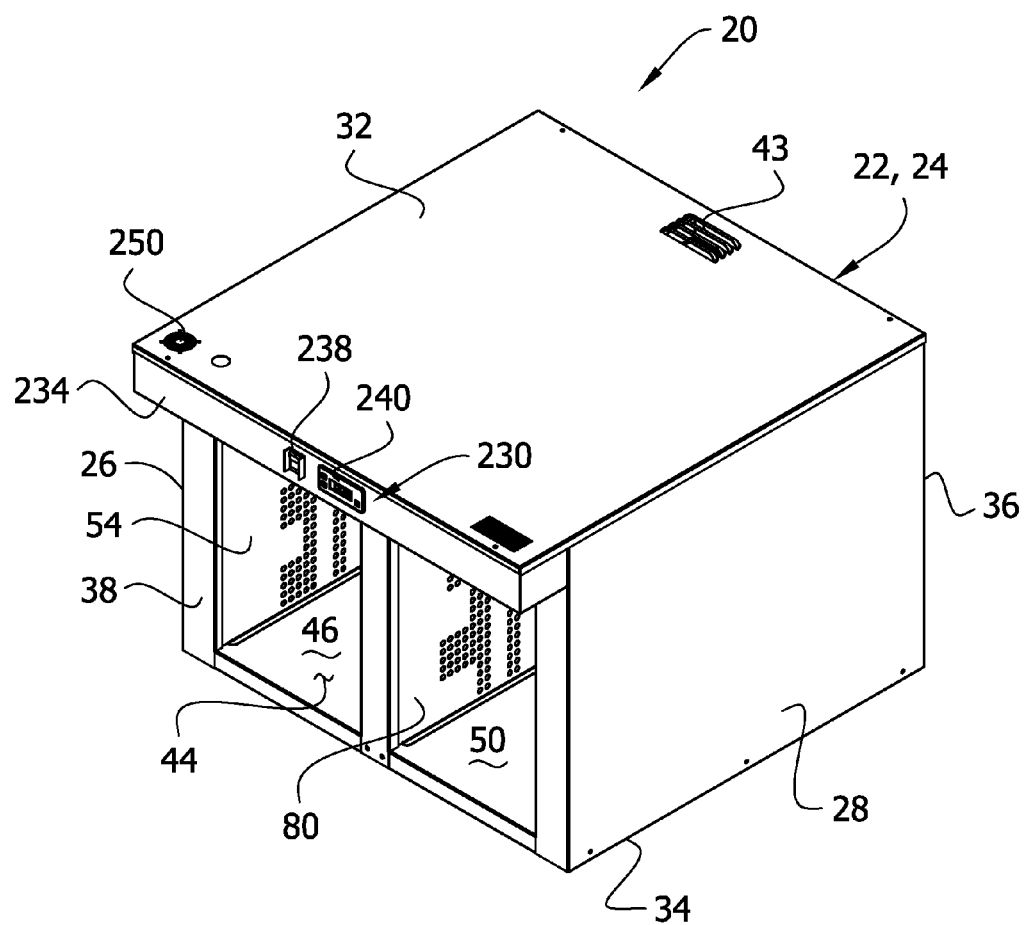
FIG. 1 is a perspective of a first embodiment of an oven of this invention.
Figure 2:
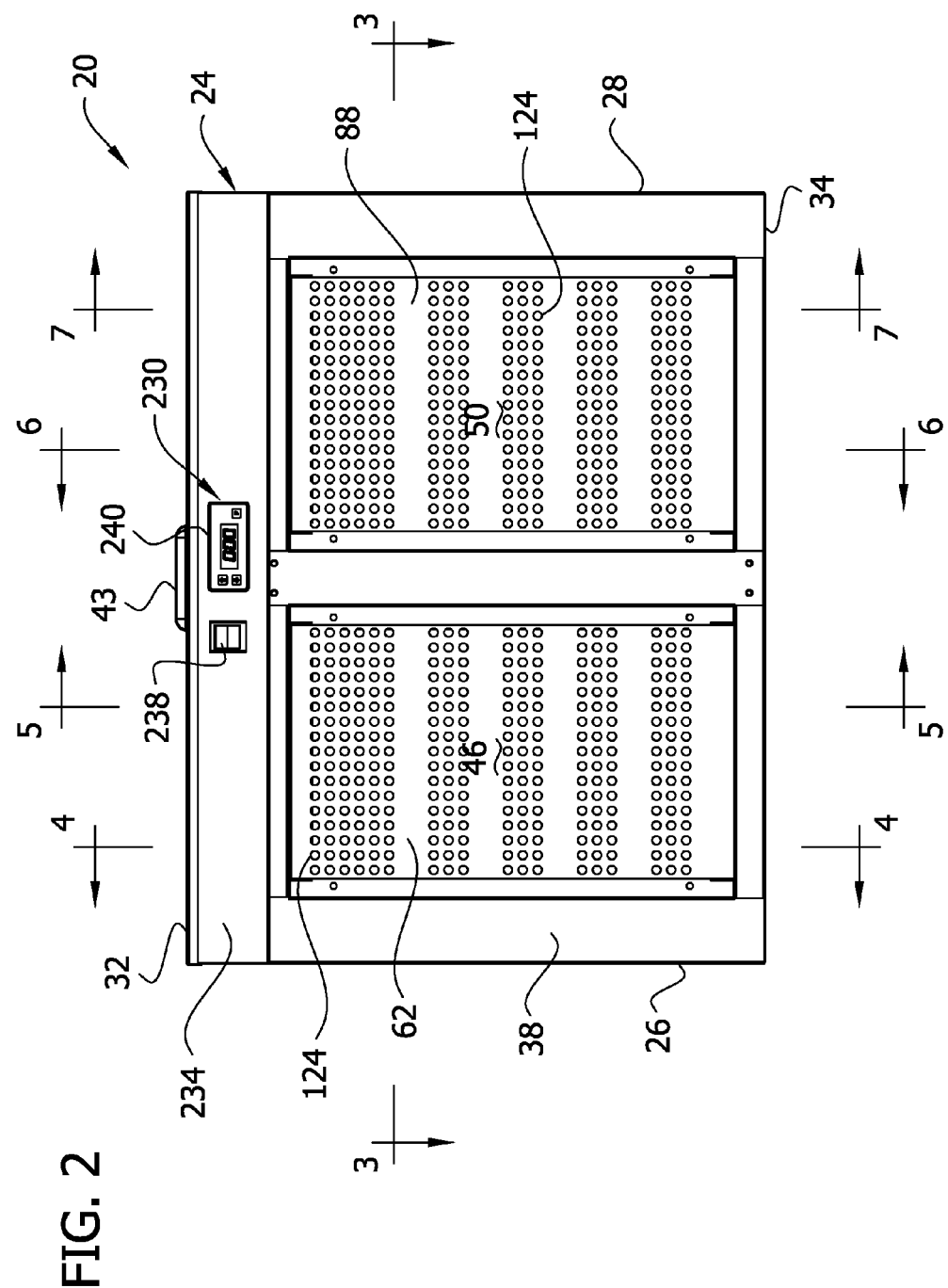
FIG. 2 is a front elevation of the oven.
Figure 3:
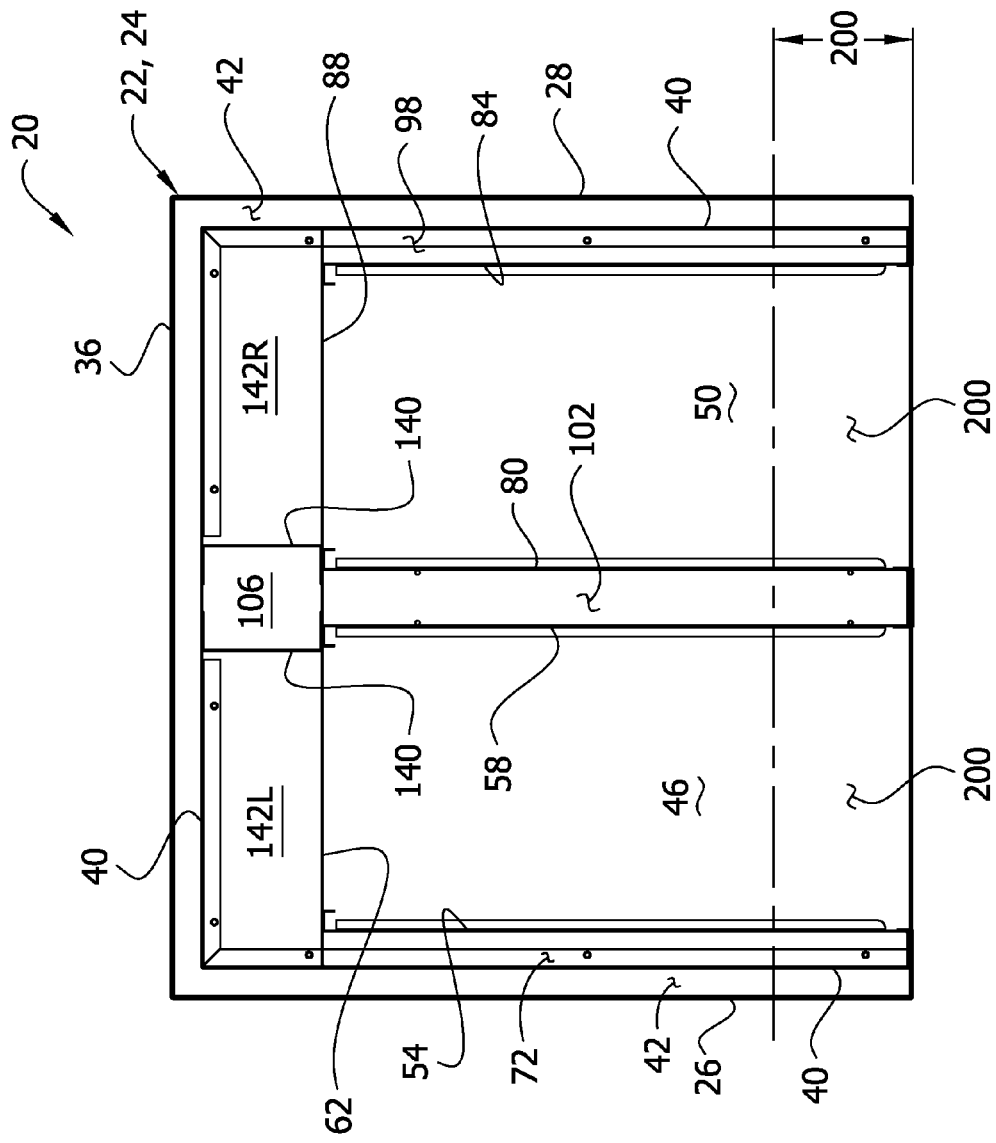
FIG. 3 is horizontal section taken in the plane of 3-3 in FIG. 2.

Referring now to the drawings, and more particularly to FIGS. 1-3, an oven of this invention for heating food with heated gas (e.g., air) is designated in its entirety by the reference number 20. The oven comprises a housing 22 having an outer box-like shell 24 with a left side 26, a right side 28, a top 32, a bottom 34, a back 36, and a front 38 which is partially open. The housing 24 also includes an inner shell or liner 40 spaced inward from the sides 26, 28, back 36 and top 32 of the outer shell 24 to form a space 42 for receiving suitable thermal insulation (see FIG. 3). A louvered vent 43 is provided in the top 32 of the outer shell 24 for venting the space 42.

The housing 22 defines an oven cavity 44 comprising at least one heating compartment 46 inside the liner 40. In this particular embodiment, the cavity 44 comprises two side-by-side heating compartments, namely, a left heating compartment 46 and a right heating compartment 50. The number and arrangement of heating compartments can vary. By way of example, the compartments may be arranged in vertical columns and horizontal rows, and the number of compartments in each column and each row may vary from one to two or more. The outer shell 24 and liner 40 of the housing 22 are constructed of suitable material, such as sheet metal.

The left heating compartment 46 is generally rectangular and is defined by a left side wall comprising a left side wall panel 54, a right side wall comprising a right side panel 58, a back wall comprising a back panel 62, a top wall comprising a top panel 66, and a bottom wall comprising a bottom wall panel 70 spaced above the bottom 34 of the housing 24. The front of the left heating compartment 46 is open to the environment surrounding the oven. The left side panel 54 of the left heating compartment 46 is spaced from the inner liner 40 to define a left side gas plenum 72.

Similarly, the right heating compartment 50 is generally rectangular and defined by a left side wall comprising a left side wall panel 80, a right side wall comprising a right side panel 84, a back wall comprising back panel 88 (which may be an integral extension of the back panel 62 of the left heating compartment 46), a top wall comprising a top panel 92 (which may be an integral extension of the top panel 66 of the left heating compartment 46), and a bottom wall comprising a bottom wall panel 96 spaced above the bottom 34 of the housing 24. The front of the right heating compartment 50 is open to the environment surrounding the oven. The right side panel 84 of the right heating compartment 50 is spaced from the inner liner 40 to define a right side gas plenum 98. The right wall 58 of the left heating compartment 46 is spaced from the left wall 80 of the right heating compartment to define an intermediate gas plenum 102 between the two heating compartments that extends the full heights of the heating compartments 46, 50 (see FIG. 3).

In the illustrated embodiment, the back panels 62, 88 of the two heating compartments 46, 50 are spaced forward of the inner liner 40 of the housing 22 to define a back gas plenum 106. Similarly, the top panels 66, 92 of the two heating compartments 46, 50 are spaced below the inner liner 40 to define a top gas plenum 110.

The various panels forming the gas plenums of the oven are of suitable material, such as sheet metal.

Figure 8:
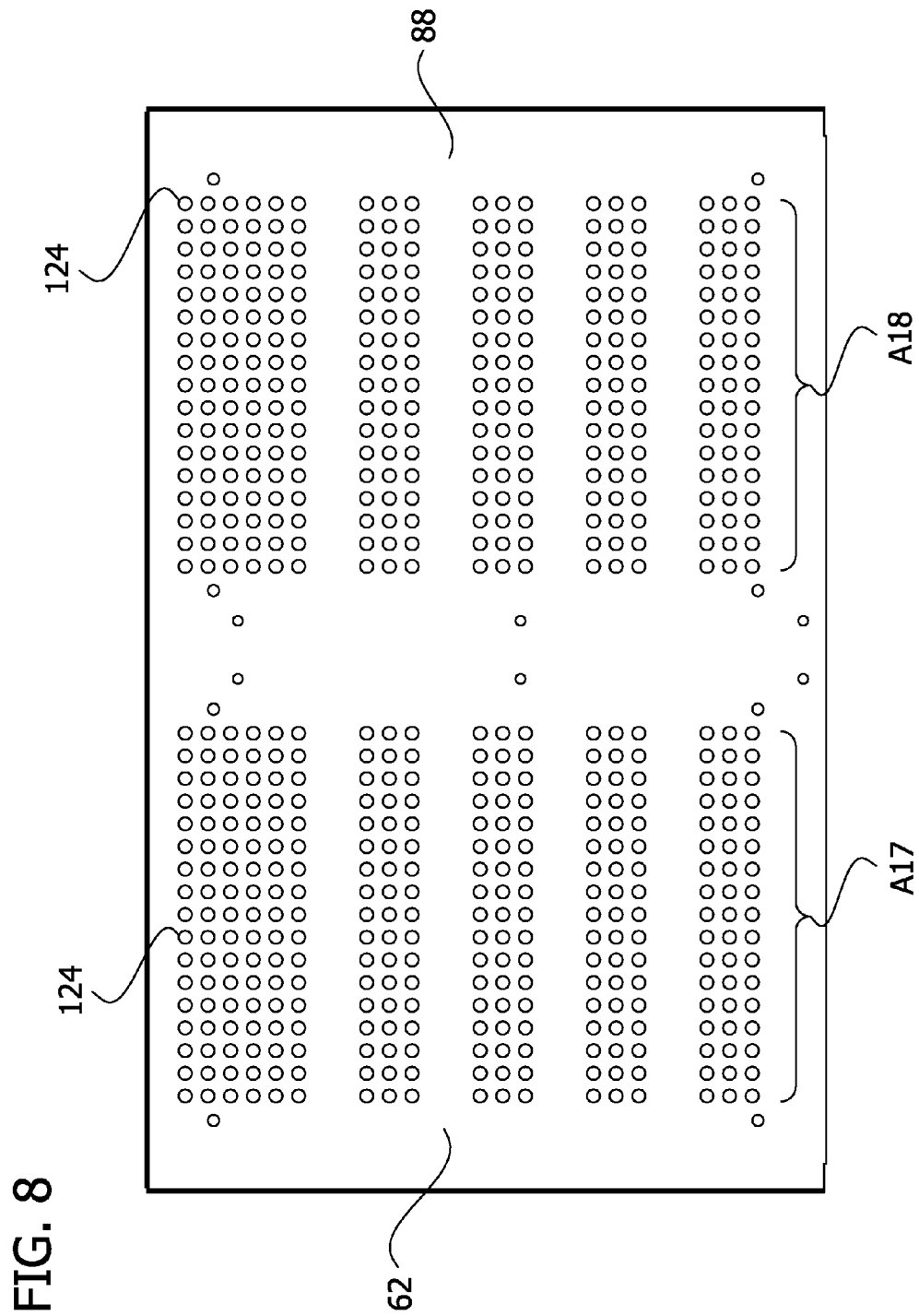
FIG. 8 is an elevation of the back wall a heating compartment of the oven.
Figure 9:
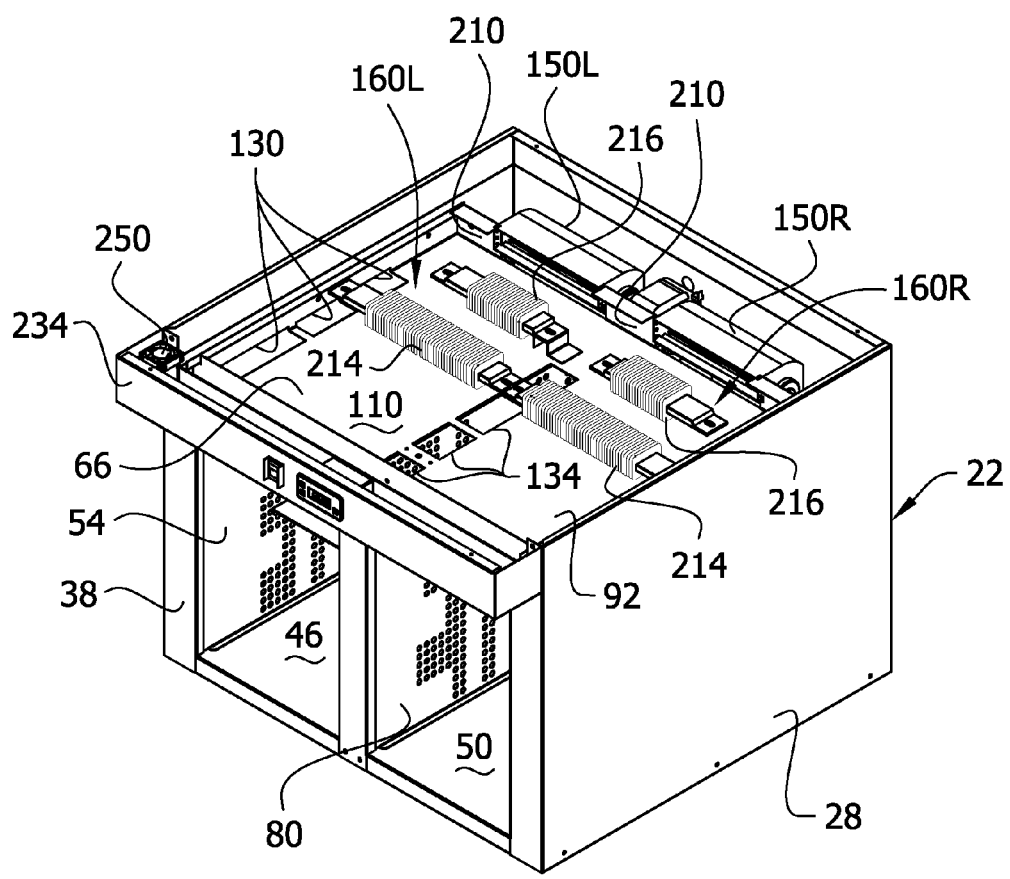
FIG. 9 is a perspective view of the oven of FIG. 1 but with top portions of the oven removed to show details.
Figure 10:
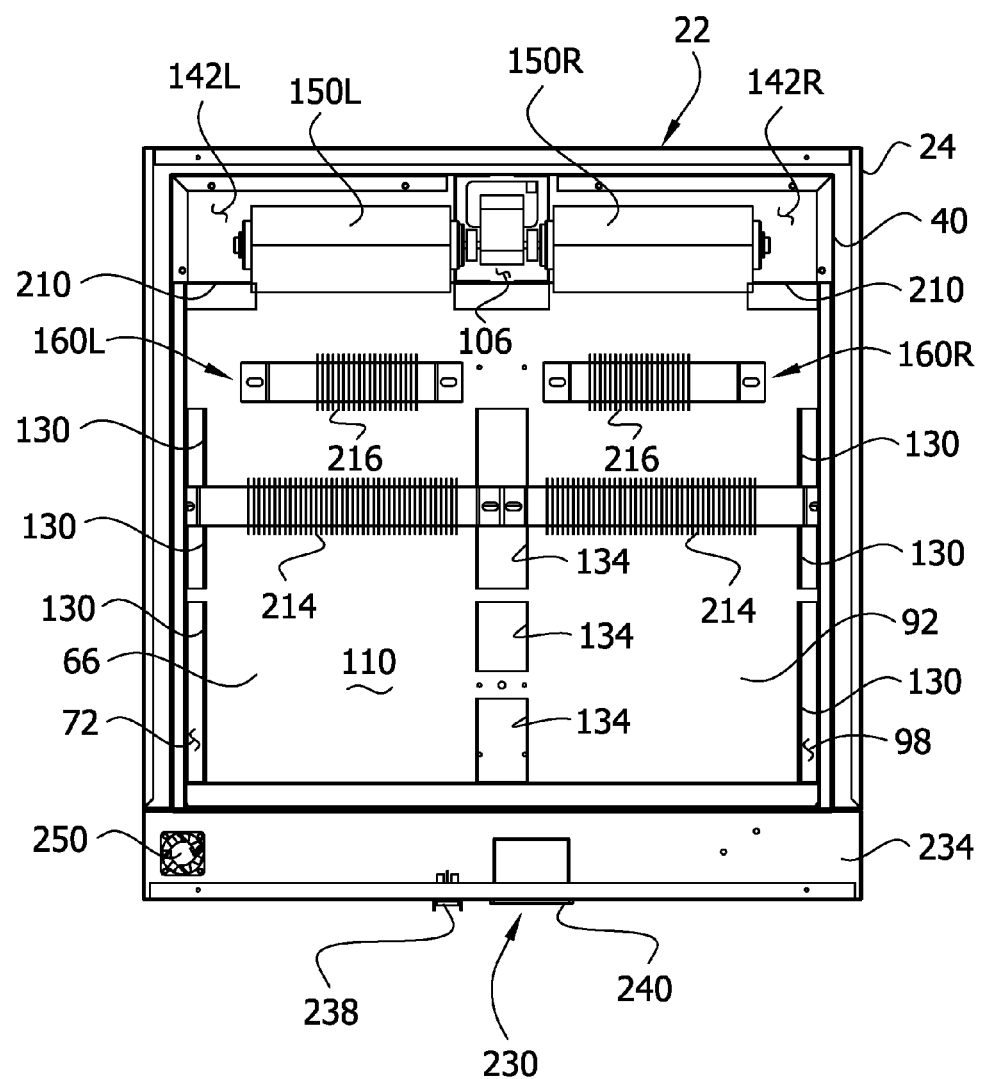
FIG. 10 is a top view of FIG. 9.

The walls of each heating compartment 46, 50 are provided with gas flow openings 120, 124 for the circulation of hot gas into and out of the compartment. In particular, the left and right side walls 54, 58, 80, 84 of each compartment are provided with side wall openings 120, and the back wall 62, 88 of each heating compartment is provided with back wall openings 124 (FIG. 8). As best shown in FIGS. 9 and 10, the top panels 66, 92 forming the top walls of the two heating compartments 46, 50 have side openings 130 that communicate with respective left and right gas plenums 72, 98 of the heating compartments, and intermediate openings 134 that communicate with the intermediate gas plenum 102.

The back gas plenum 106 is divided by a pair of spaced vertical partitions 140 into a left gas flow channel 142L communicating with the left heating compartment 46 and the top gas plenum 110, and a right gas flow channel 142R, separate from the left gas flow channel 142L, communicating with the right heating compartment 50 and the top gas plenum. As illustrated best in FIGS. 4 and 6, each of these flow channels 142L, 142R extends substantially the full height of a respective compartment 46, 50. The flow channels communicate with respective heating compartments 46, 50 through the openings 124 in the back panels 62, 88. Essentially all gas exiting the left heating compartment 46 flows into the left gas flow channel 142L, and essentially all gas exiting the right heating compartment 50 flows into the right gas flow channel 142R.

A left blower 150L is suitably positioned in the left gas flow channel 142L, e.g., adjacent its upper end, for circulating gas along a gas flow path through the left heating compartment 46. In particular, gas from the blower 150L enters the top plenum 110; flows via respective left side and intermediate openings 130, 134 in the top panel 66 down into the left and intermediate gas plenums 72, 102; flows via the gas flow openings 120 in the left and right panels 54, 58 into the left heating compartment 46; and exits the compartment via the openings 124 in the back panel 62 into the left gas flow channel 142L for flow back to the blower 150L.

Similarly, a right blower 150R is suitably positioned in the right gas flow channel 142R, e.g., adjacent its upper end, for circulating gas along a gas flow path through the right heating compartment 50. In particular, gas from the right blower 150R enters the top plenum 110; flows via respective right side and intermediate openings 130, 134 in the top panel 92 down into the right and intermediate plenums 98, 102; flows via the gas flow openings 120 in the left and right panels 80, 84 into the right heating compartment 50; and exits the compartment via the openings 124 in the back panel 88 into the right gas flow channel 142R for flow back to the right blower 150R.

Referring to FIGS. 9 and 10, a left heater 160L is provided in the top plenum 110 generally at a location over the left heating compartment 46 for heating gas from the discharge of the left blower 150L. Similarly, a right heater 160R is provided in the top plenum 110 generally at a location over the right heating compartment 50 for heating gas from the discharge of the right blower 150R. Alternatively, the heaters 160L, 160R can be placed immediately upstream from the blower inlets. By way of example but not limitation, each heater can comprise one or more electric resistance heating elements.

Figure 11:
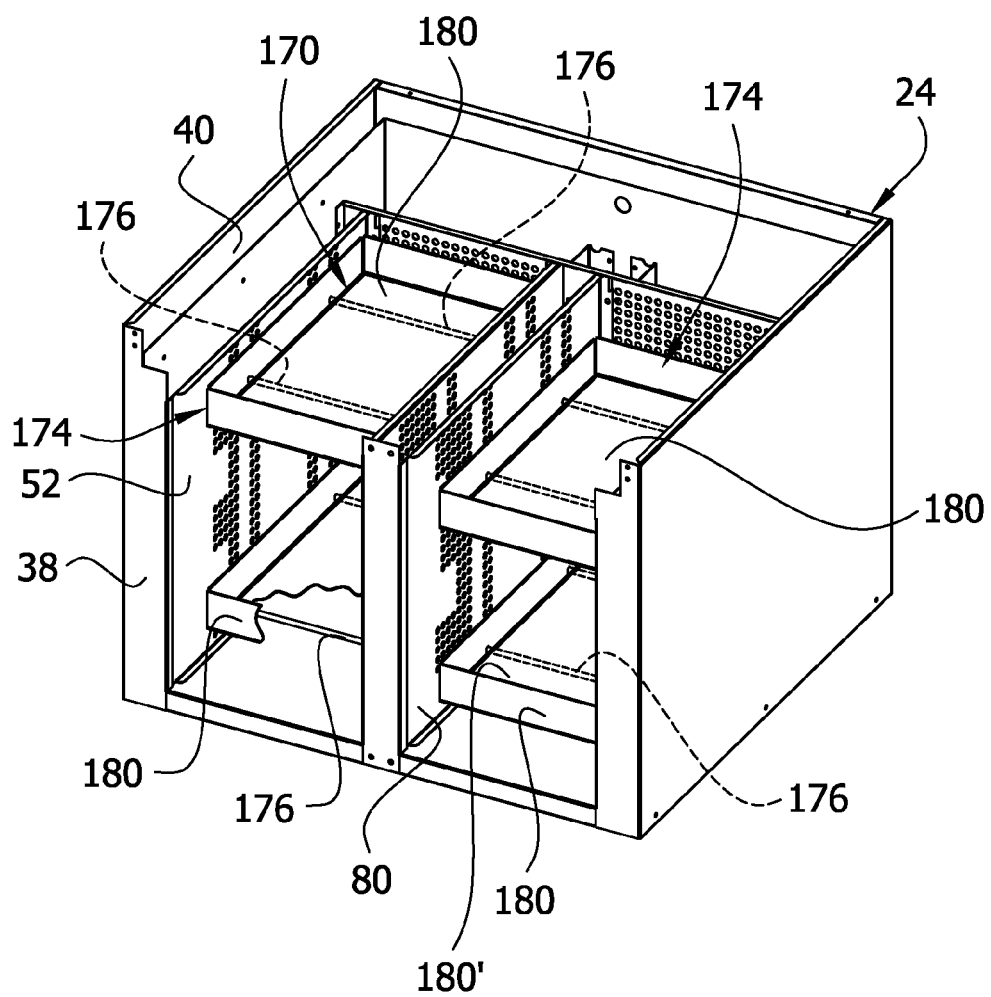
FIG. 11 is a perspective view showing food-holding trays positioned in the heating compartments.

Referring to FIG. 11, a suitable support system 170 is provided for supporting food in each compartment at adjustable or non-adjustable levels within the compartment. In the illustrated embodiment, the support system 170 includes one or more supports 174, each of which comprises horizontal rods 176 having ends sized for reception in the openings 120 in the side walls panels of the heating compartment, and one or more food holders 180 (e.g., trays or racks) supported by the rods. The rods 176 are removable so that each holder 180 is adjustable up and down in the heating compartment, as needed or desired, simply by inserting the rods in a different set of side wall openings 120.

Desirably, each heating compartment 46, 50 has a side-to-side width of no more than about 14 inches, exemplary dimensions being anywhere in the range of 4-14 inches (e.g., 4, 6, 8, 10, 12, or 14 inches). The relatively narrow width of each compartment 46, 50 insures that hot gas entering the heating compartment via the left and right side openings 120 contacts the entire surface of each food product in the compartment, even the portions toward the middle of the compartment. The shorter distances required for gas flow results in good thermal heat transfer to the food and reduced temperature differential across the food (i.e., more uniform heating of the food).

Figure 13:
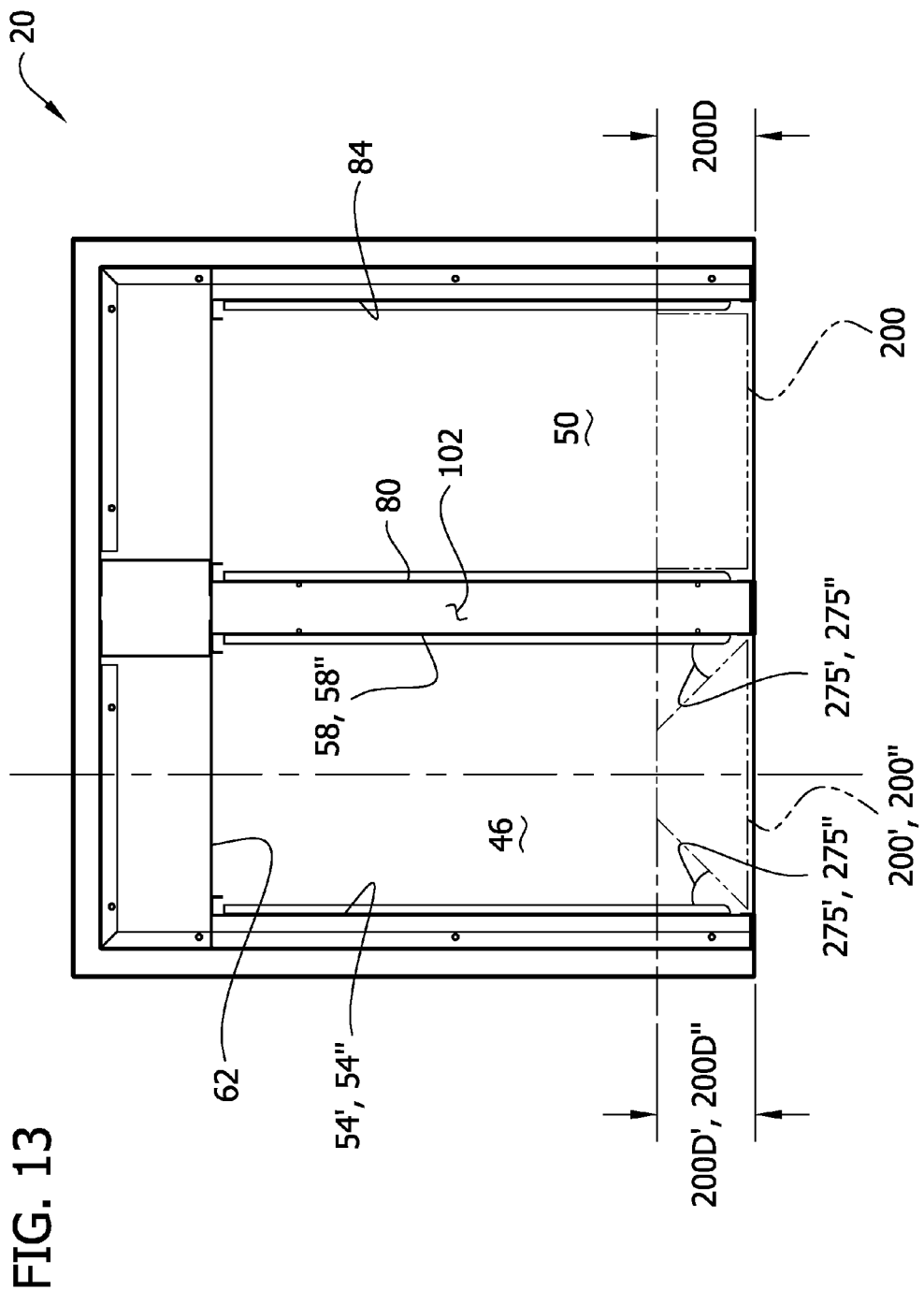
FIG. 13 is a top view similar to FIG. 3; showing a dead zone of the oven.

Desirably, the openings 120 in the left and right side walls 54, 58, 80, 84 of each heating compartment 46, 50 are spaced a substantial distance rearward from the open front of the compartment to create a gas dead zone 200 at the front of each heating compartment extending substantially an entire height of the compartment and a full side-to-side width of the compartment. The zone 200 has a dimension in front-to-rear direction of at least 2 in., e.g., 2, 3, 4, 5, or 6 in. or more. The gas dead zone 200 is illustrated in FIG. 3. The gas dead zone 200 is also illustrated in FIG. 13 in the heating compartment 50. The gas dead zone 200 of this embodiment has a generally rectangular horizontal cross-section. In other words, a depth 200D of the gas dead zone 200 is substantially constant across the full side-to-side width of the compartment 50. The gas dead zone 200 may have different shapes, as discussed in more detail below. During operation of the oven 20, this zone 200 is substantially free of moving gas generated by the oven. The zone 200 acts as a thermal barrier for preventing substantial loss of heat from the heating compartment 46, 50. As a result, there is no need for a door at the front of the compartment, making access to the compartment more convenient for loading and unloading of food.

The gas flow into and out of each heating compartment 46, 50 is closely controlled by the pattern and size of gas openings 120, 124 in the walls of the compartment. A representative arrangement of openings 120, 124 is described below for an oven in which each of the left and right heating compartments has a height of about 15.0 in., a width of about 8.0 in., and a depth of about 19.0 in.

Figure 4:
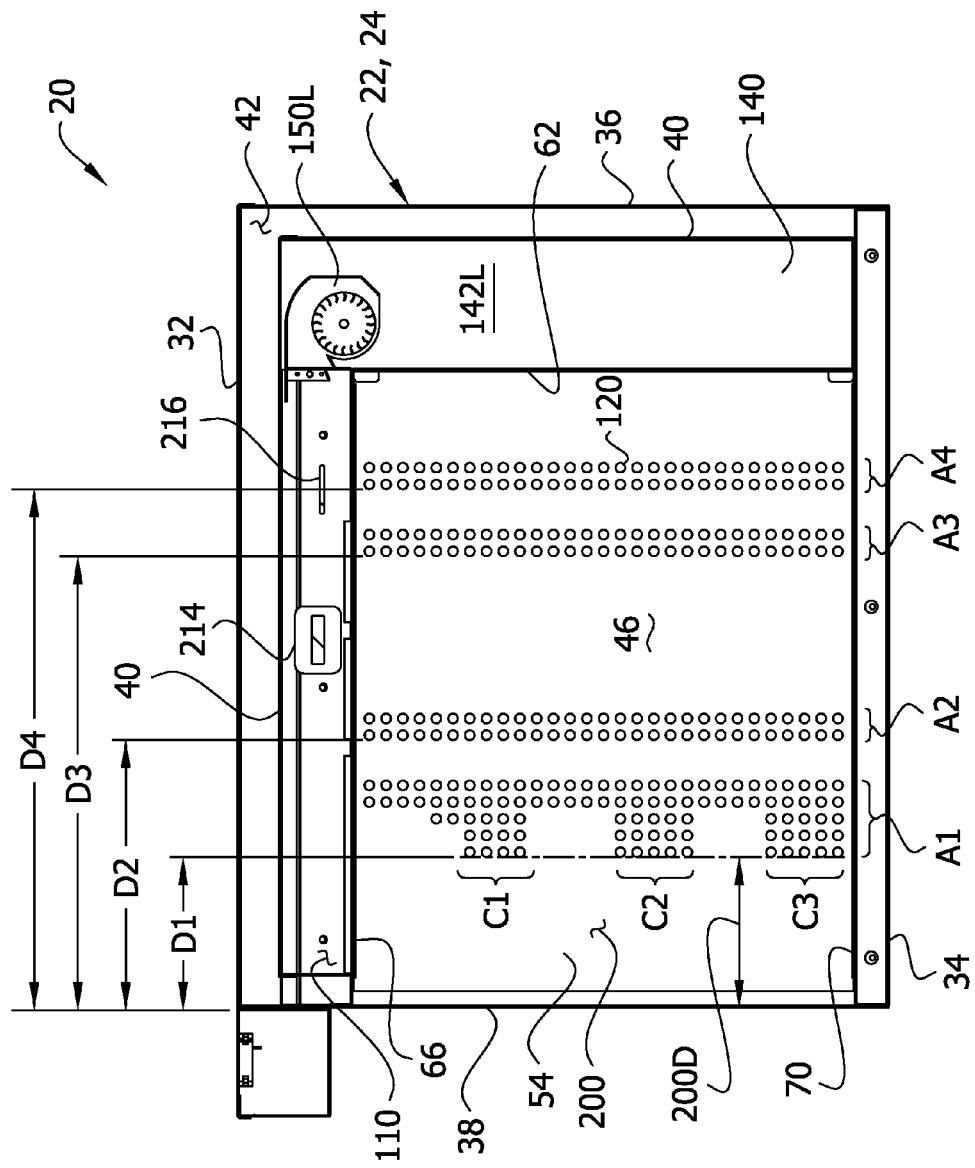
FIG. 4 is a vertical section taken in the plane of 4-4 in FIG. 2.

FIG. 4 illustrates the left panel 54 defining the left side wall of the left heating compartment 46. The gas flow openings 120 in the panel 54 are arranged in four vertical arrays A1-A4 spaced at different distances D1-D4 from the front of the heating compartment 46, e.g., 3.5 in., 8.0 in., 13.5 in., and 15.5 in., respectively. (D1 corresponds to the depth of the aforementioned gas dead zone 200.) Each array A1-A4 of openings comprises a matrix of columns and rows extending from adjacent the top of the panel 54 to adjacent the bottom of the panel. The width of the array A1 (i.e., the number of columns in the matrix) varies in the vertical direction to form a series of relatively wide vertically-spaced clusters C1-C3 of openings. The widths of the second, third, and fourth arrays A2-A4 are identical (two columns per array). The openings have a diameter of about 0.290 in., a vertical center-to-center spacing of about 0.50 in., and a horizontal center-to-center spacing of about 0.50 in. Other dimensions are possible. Further, while the openings shown in the drawings are of the same size, they may differ in size.

Figure 5:
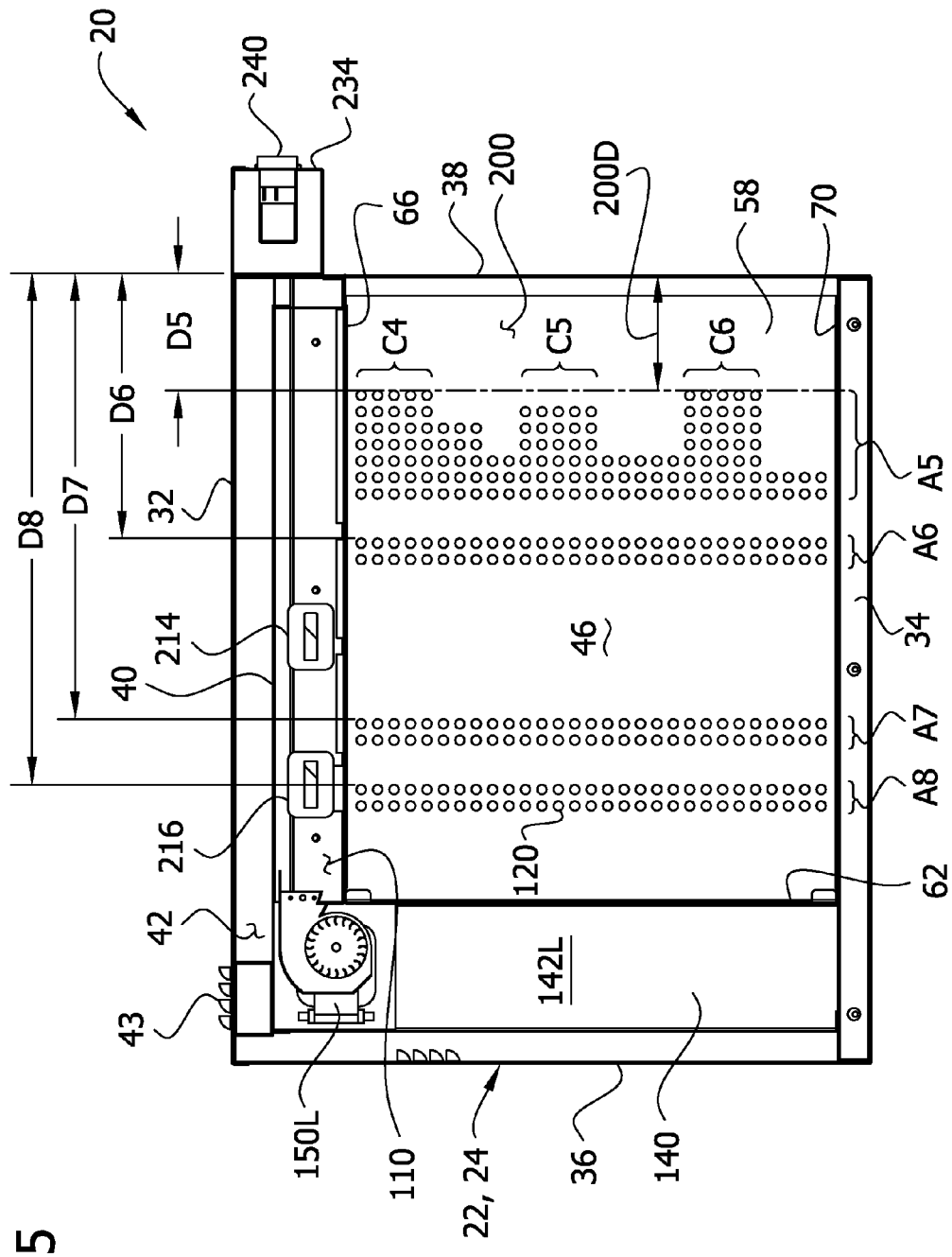
FIG. 5 is a vertical section taken in the plane of 5-5 in FIG. 2.

FIG. 5 illustrates the right panel 58 defining the right side wall of the left heating compartment 46. The gas flow openings 120 in the panel 58 are arranged in four vertical arrays A5-A8 spaced at different distances D5-D8 from the front of the heating compartment 46, e.g., 3.5 in., 8.0 in., 13.5 in., and 15.5 in., respectively. (D5 corresponds to the depth J of the aforementioned gas dead zone 200.) Each array A5-A8 of openings comprising a matrix of columns and rows extending from adjacent the top of the panel 58 to adjacent the bottom of the panel. The width of the array A5 (i.e., the number of columns in the matrix) varies in the vertical direction to form a series of relatively wide vertically-spaced clusters C4-C6 of openings. The clusters C4-C6 are staggered vertically with respect to the clusters C1-C3 of the left panel 54 to provide more uniform gas flow into the heating compartment 46. The widths of the arrays A6-A8 are identical (two columns per array). The openings have a diameter of about 0.290 in., a vertical center-to-center spacing of about 0.50 in., and a horizontal center-to-center spacing of about 0.50 in. Other dimensions are possible. Further, while the openings shown in the drawings are of the same size, they may differ in size.

Figure 6:
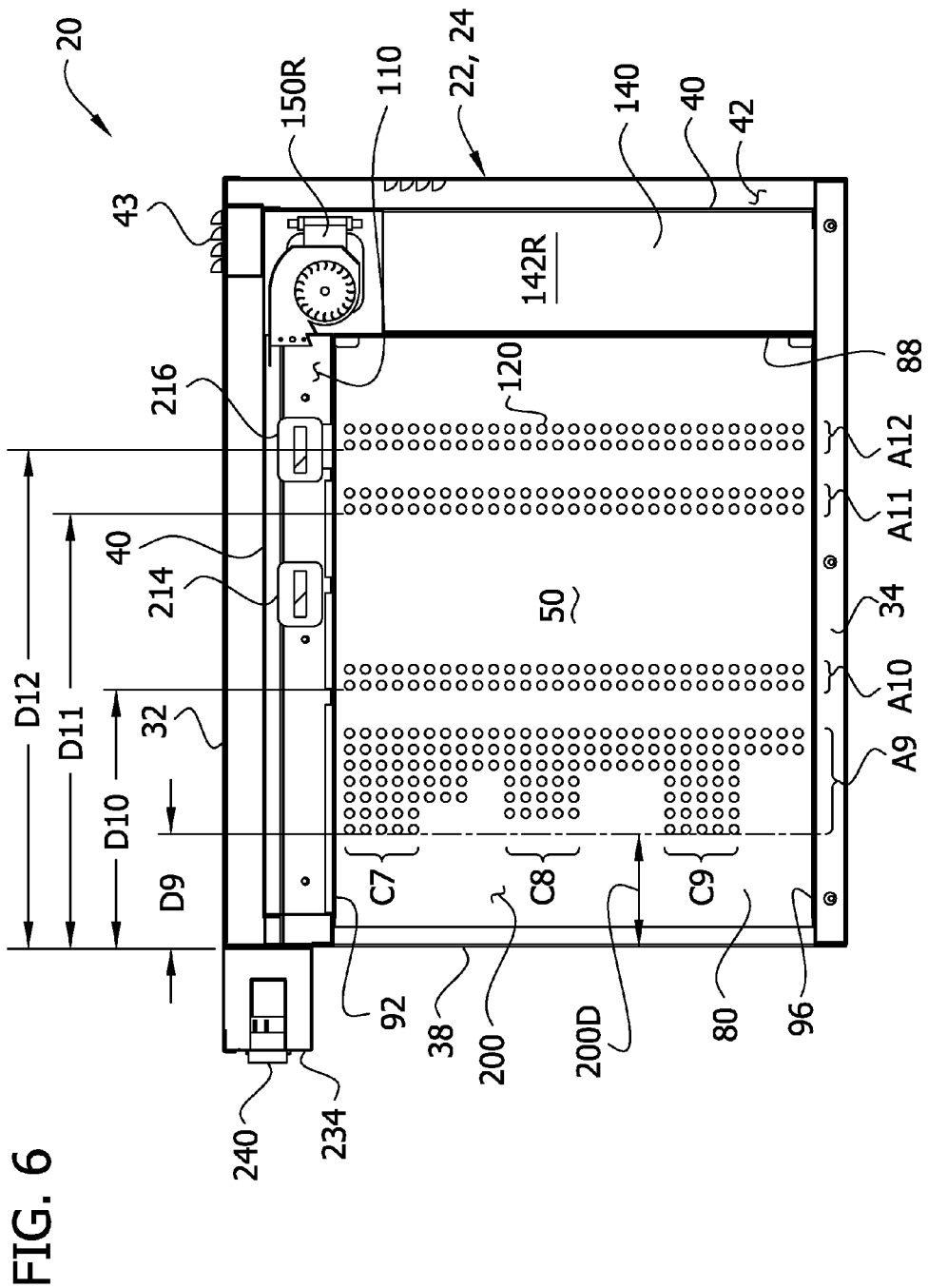
FIG. 6 is a vertical section taken in the plane of 6-6 in FIG. 2.

FIG. 6 illustrates the left panel 80 of the right heating compartment 50. The gas flow openings 120 in the panel 80 are arranged in four vertical arrays A9-A12 spaced at different distances D9-D12 from the front of the heating compartment 50, e.g., 3.5 in., 8.0 in., 13.5 in., and 15.5 in., respectively. (D9 corresponds to the depth of the aforementioned gas dead zone 200.) Each array A9-A12 of openings comprises a matrix of columns and rows extending from adjacent the top of the panel 80 to adjacent the bottom of the panel. The width of the array A9 (i.e., the number of columns in the matrix) varies in the vertical direction to form a series of relatively wide vertically-spaced clusters C7-C9 of openings. The widths of the arrays A6-A8 are identical (two columns per array). The openings 120 have a diameter of about 0.290 in., a vertical center-to-center spacing of about 0.50 in., and a horizontal center-to-center spacing of about 0.50 in. Other dimensions are possible. Further, while the openings shown in the drawings are of the same size, they may differ in size. In the illustrated embodiment, the openings 120 in the panel 80 have the same pattern and size as the openings 120 in the right panel 58 of the left heating compartment 46.

Figure 7:
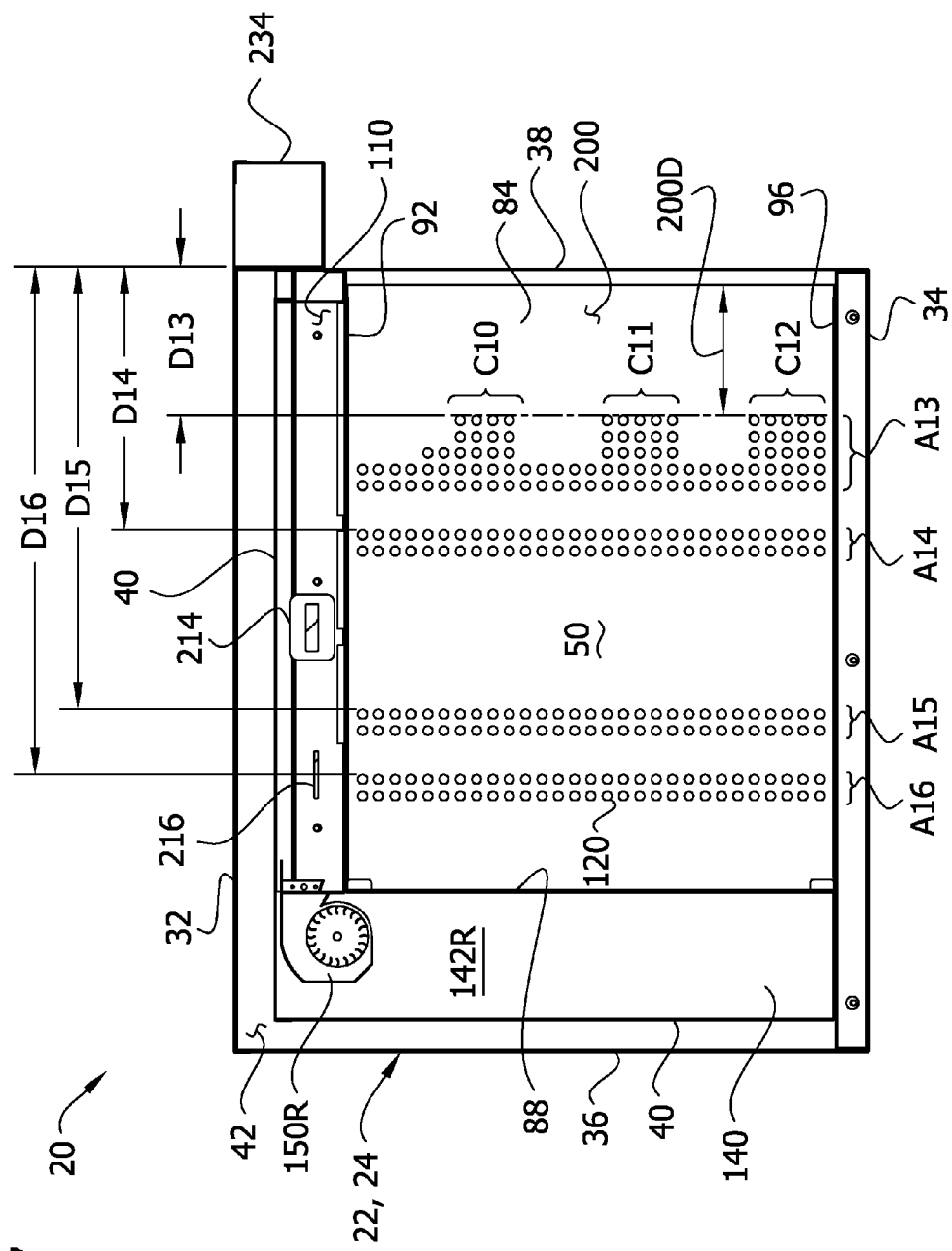
FIG. 7 is a vertical section taken in the plane of 7-7 in FIG. 2.

FIG. 7 illustrates the right panel 84 of the right heating compartment 50. The gas flow openings 120 in the panel 84 are arranged in four vertical arrays A13-A16 spaced at different distances D13-D16 from the front of the heating compartment 50, e.g., 3.5 in., 8.0 in., 13.5 in., and 15.5 in., respectively. (D13 corresponds to the depth of the aforementioned gas dead zone 200.) Each array A13-A16 of openings comprises a matrix of columns and rows extending from adjacent the top of the panel 84 to adjacent the bottom of the panel. The width of the array A13 (i.e., the number of columns in the matrix) varies in the vertical direction to form a series of relatively wide vertically-spaced clusters C10-C12 of openings. The clusters C10-C12 are staggered vertically with respect to the clusters C7-C9 of the left panel 80 of the right heating compartment 50 to provide more uniform gas flow into the heating compartment. The widths of the arrays A14-A16 are identical (two columns per array). The openings 120 have a diameter of about 0.290 in., a vertical center-to-center spacing of about 0.50 in., and a horizontal center-to-center spacing of about 0.50 in. Other dimensions are possible. Further, while the openings shown in the drawings are of the same size, they may differ in size. In the illustrated embodiment, the openings 120 in the panel 84 have the same pattern and size as the openings 120 in the left panel 54 of the left heating compartment 46.

In general, the gas flow openings 120 in the left and right panels 54, 58, 80, 84 of each heating compartment 46, 50 are arranged and sized such that gas is delivered substantially uniformly into the heating compartment in a vertical direction from adjacent the top wall 66, 92 of the heating compartment to adjacent the bottom wall 70, 96 of the heating compartment, and such that gas is delivered substantially uniformly into the heating compartment from a location generally immediately rearward from the gas dead zone 200 to the back wall 62, 88 of the heating compartment. The pattern and size of the openings 120 will vary according to such factors as the height, width, and depth dimensions of the heating compartment 46, 50, the number and vertical spacing of the food supports 174 in the compartment, and the velocity and volume of the gas flowing through the compartment.

FIG. 8 illustrates the back panels 62, 88 defining the back walls of the left and right heating compartments 46, 50, respectively. In the illustrated embodiment, the back panels 62, 88 are integrally formed as one piece of sheet metal. In other embodiments, they may be formed as separate panels. The openings 124 in the left panel 62 are arranged in a first array A17 providing communication between the left heating compartment 46 and the left gas flow channel 142L of the back plenum 106, and the openings 124 in the right panel 88 are arranged in a second array A18 (identical to the first array A17 in this embodiment) providing communication between the right heating compartment 50 and the right gas flow channel 142R of the back plenum 106. Each of the arrays A17, A18 comprises five vertically-spaced groups of openings, and each group comprises a matrix of columns and rows covering a major portion of the back wall of a respective compartment. The openings have a diameter of about 0.290 in., a vertical center-to-center spacing of about 0.50 in., and a horizontal center-to-center spacing of about 0.50 in. Other dimensions are possible.

FIG. 10 illustrates the top panels 66, 92 defining the top walls of the left and right compartments 46, 50, respectively. Each group of side openings 130 includes a plurality of rectangular openings (three such openings being shown) for flow of gas from the top gas plenum 110 to respective side gas plenums 72, 98. The rear and center openings 130 closest the blowers 150L, 150R are smaller than the forward opening 130 farthest from the blowers to provide for a more uniform distribution of gas from the top plenum 110 to respective side plenums 72, 98. The group of intermediate openings 134 includes a plurality of rectangular openings (four such openings being shown) for flow of gas from the top gas plenum 110 to the intermediate gas plenum 102. The side and intermediate openings 130, 134 may vary in number and shape.

In the illustrated embodiment, the left and right heating compartments 46, 50 are of the same size. However, it will be understood that heating compartments may vary in size with respect to one another. Regardless of size, however, the arrangement of the gas flow openings 120, 124 should be such that the gas moving through the compartment has good heat transfer contact with the food substantially uniformly over the entire surface of the food in the compartment.

The left and right blowers 150L, 150R used in the two-compartment oven described above, may be tangential blowers, mounted side-by-side in a double housing such that the gas is discharged from the blowers through openings in a vertical flange 210 projecting up from the top panels 66, 92 (FIG. 9). By way of example but not limitation, each blower may have an impeller diameter of 65 mm, a static pressure in its discharge plenum of about 0.036 IWC, and generate a gas flow rate of 165 cubic feet per minute.

Also, by way of example, each of the left and right heaters 160L, 160R may include a first relatively longer finned electric heating element 214 extending widthwise of the oven and a second relatively shorter electric heating element 216 spaced rearward from and generally parallel to the first element. The elements 214, 216 of each heater 160L, 160R are secured to a respective top panel 66, 92 and extend between the side and intermediate openings 130, 134 of the panel above a respective heating compartment 46, 50. Other locations are possible. In one example, each heating element 214, 216 has a power output of 500 watts, for a total output of 1000 watts per heater 160L, 160R, but this power output will vary according to the heating requirements of the oven.

Desirably, the oven has a suitable control system 230 for operating the oven. The system is housed in a control housing 234 secured to the front 38 of the oven housing 22. The control system 230 includes an on/off power switch 238 and an operator input 240 for inputting desired operational information such as compartment temperature, heating time, and specific programs for heating (e.g., rethermalizing) and/or holding food in the oven. The control system 230 also includes a processor (not shown) for processing such information and controlling the blowers 250L, 250R and heaters 260L, 260R accordingly. It is preferable (although not essential) to configure the system such that the operation of the blowers 150L, 150R may be controlled independent of one another, and such that the operation of the heaters 160L, 160R may be controlled independent of one another. This allows each heating compartment 46, 50 to be operated in a "modular" fashion independent of one another for greater flexibility in the use of the oven. By way of example, different foods may be heated in different heating compartments. Further, the number of compartments used at any given time may be tailored to meet the demand.

A fan 250 is provided for circulating air through the control system housing 234 to cool the various electronic components of the control system.

In a second embodiment (not shown), the oven 20 has a configuration similar to the first embodiment (FIGS. 1-11) but is altered to have a modified circulation of gas into and out of the compartments 46, 50. In particular, gas flows into the compartments 46, 50 through the openings 120 in respective side walls 54 and 84, and gas flows out of the compartments through the openings 120 in respective side walls 58 and 80 as well as through the openings 124 in the back panels 62, 88. Thus, gas flows into each compartment 46, 50 through one wall 54, 84, and flows out of each compartment through two walls 58, 80, 62, 88.

The structure of the second embodiment is different from the embodiment described above in that the second embodiment lacks the intermediate openings 134 that enable communication between the top gas plenum 110 and the intermediate gas plenum 102. The second embodiment has additional openings 124 in the back panels 62, 88 that are disposed inboard of the side walls 58 and 80 to enable communication between the intermediate gas plenum 102 and the space between the vertical partitions 140 in the back gas plenum 106. In addition, openings are provided in the vertical partitions 140 to enable communication among the space between the partitions and the left and right flow channels 142L, 142R.

Referring to the left heating compartment 46, gas flow generated by the blowers 150L, 150R enters the top gas plenum 110; flows via the left side openings 130 in the top panel 66 down into the left gas plenum 72; flows via the gas flow openings 120 in the left panel 54 into the compartment 46; and exits the compartment via the openings 120 in the right panel 58 and the openings 124 in the back panel 62. Gas flow is returned to the blower 150L via the left gas flow channel 142L, which collects gas flow directly from the openings 124 in the back panel 62 and from the openings 120 in the side wall 58 through the intermediate gas plenum 102 and the space between the vertical partitions 140.

Referring to the right heating compartment 50, gas flow generated by the blowers 150L, 150R enters the top gas plenum 110, flows via the right side openings 130 in the top panel 92 down into the right gas plenum 98; flows via the gas flow openings 120 in the right panel 84 into the compartment 50; and exits the compartment via the openings 120 in the left panel 80 and the openings 124 in the back panel 88. Gas flow is returned to the blower 150R via the right gas flow channel 142R, which collects gas flow directly from the openings 124 in the back panel 88 and from the openings 120 in the side wall 80 through the intermediate gas plenum 102 and the space between the vertical partitions 140.

In the second embodiment, the arrangement of the gas flow openings 120, 124 may vary to accomplish a desired gas movement through the compartments 46, 50 to impart good heat transfer contact with the food substantially uniformly over the entire surface of the food in the compartments. For example, in one test, 75% of the openings in the rear panels 62 and 88 shown in FIG. 8 were absent or blocked. Other arrangements of the gas flow openings 120, 124 may be used to impart desired gas movement through the compartments 46, 50 to impart good heat transfer contact with the food substantially uniformly over the entire surface of the food.

Figure 12:
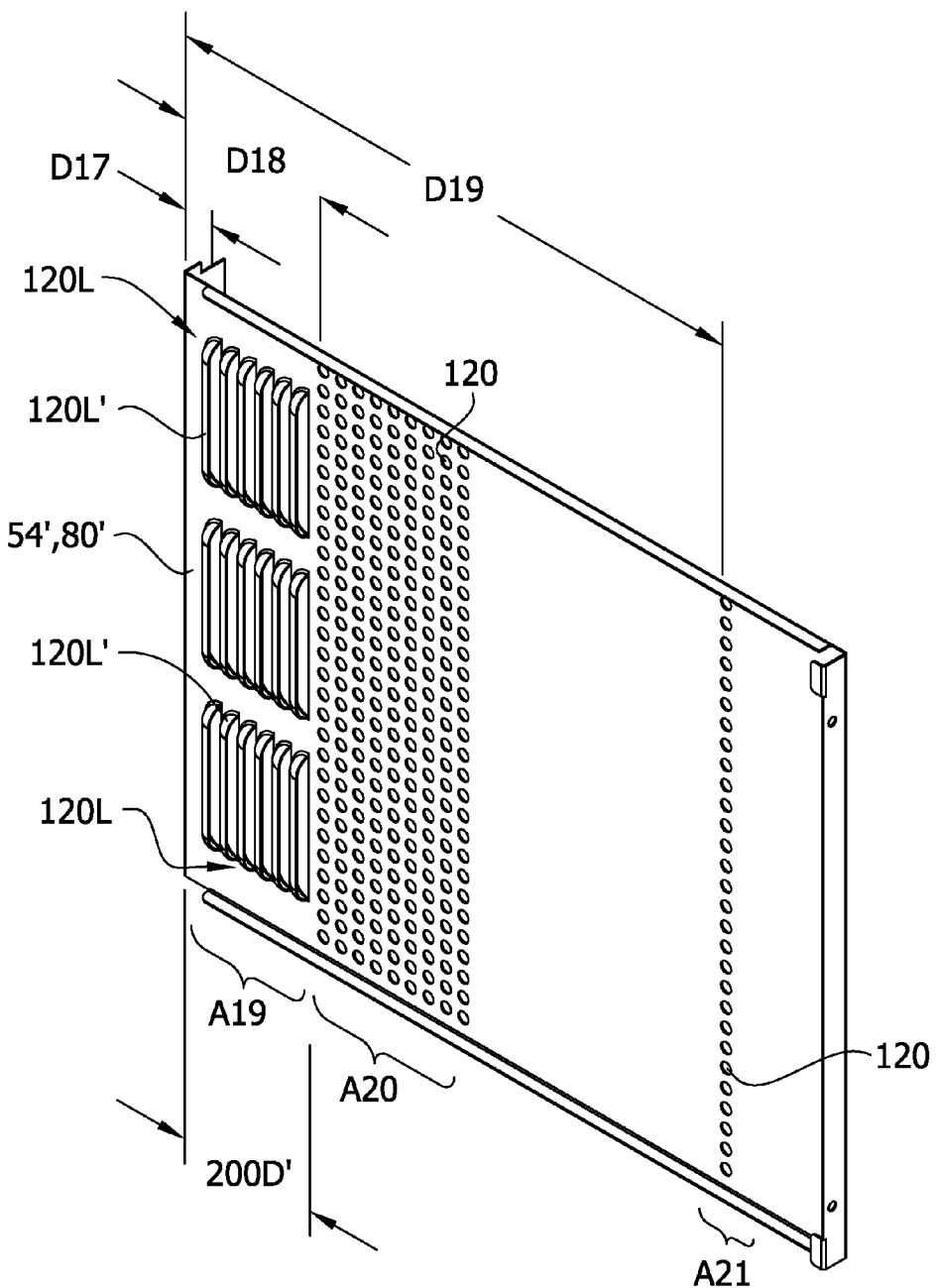
FIG. 12 is a perspective view of a side wall panel of a heating compartment.

In a third embodiment, the oven 20 has a configuration similar to the first embodiment but has modified side wall panels. A representative modified side wall panel 54', 80' is illustrated in FIG. 12. In general, the third embodiment is different from the first embodiment in that the side wall panels of the third embodiment have at least some louvered gas flow openings 120L that direct gas exiting the left, right, and intermediate gas plenums 72, 98, and 102 through the louvered openings toward the rear of the heating compartments 46, 50. The louvered openings 120L assist in preventing substantial loss of heat from the heating compartments 46, 50 to ambient through the open fronts of the compartments. As a result, there is no need for a door at the front of each compartment.

The side wall panel illustrated in FIG. 12 is configured for use as the left side panel 54' of the left side heating compartment 46 and/or the left side panel 80' of the right side heating compartment 50. The corresponding right side panels 58', 84' (not shown) are generally a mirror image of the illustrated panel 54', 58', but may be different.

The gas flow openings 120, 120L of the panel 54', 80' are arranged in three vertical arrays A19-A21 spaced at different distances D17-D19 from the front of the heating compartment 46, e.g., 1.0 in., 5.0 in., and 14.5 in., respectively. Each array A19-A21 of openings comprises a matrix of columns and rows extending from adjacent the top of the panel 54' to adjacent the bottom of the panel.

The first array A19 comprises the louvered gas flow openings 120L. In the illustrated embodiment, the array comprises six columns and three rows of louvered openings 120L. Louvers 120L' direct gas entering the compartment through the openings in a direction generally toward the rear of the compartment 46 and toward a centerline 250 (FIG. 13) extending from the front to the rear of the compartment. The louvers 120L' direct gas flow at an angle 275' (FIG. 13) less than or equal to seventy-five degrees with respect to the side wall panel 54'. In the illustrated embodiment, the angle 275' is approximately forty-five degrees. Accordingly, the louvered openings 120L assist in preventing substantial loss of heat from the heating compartment 46. In addition, the louvered openings 120L assist in directing heated gas toward the openings in the back wall panel 62 for return to the left gas flow channel 142L. Other types, configurations, and arrangements of louvered or baffled openings 120L may be used to accomplish desired gas flow.

The third embodiment has a gas dead zone 200' at the front of the compartment similar to the first embodiment, but the gas dead zone 200' in the third embodiment has a different shape than in the first embodiment. FIG. 13 illustrates the gas dead zone 200 of the first embodiment in the right compartment 50 (i.e., the compartment 50 has left and right side wall panels 80, 84 as described with respect to the first embodiment), and illustrates the gas dead zone 200' of the third embodiment in the left compartment 46 (i.e., the compartment 46 has left and right side wall panels 54', 58' as described with respect to the third embodiment). As discussed above, the gas dead zone 200 of the first embodiment has a generally rectangular horizontal cross-section. The depth 200D of the gas dead zone 200 is substantially constant across the full side-to-side width of the compartment 50.

In the third embodiment, the gas dead zone 200' has a generally trapezoidal horizontal cross-section. This trapezoidal shape results from gas flowing from the louvered openings 120L into the compartment. As in the first embodiment, the gas dead zone 200' extends substantially the entire height of the compartment 46 and the full side-to-side width of the compartment at the open front of the compartment. In addition, the gas dead zone 200' has a dimension (e.g., dimension 200D' shown in FIGS. 12 and 13) in the front-to-rear direction of at least at least 2 in., e.g., 2, 3, 4, 5, or 6 in. or more. However, the depth 200D' of the gas dead zone 200' (i.e., the front to rear dimension of the gas dead zone) varies across the side-to-side width of the compartment 46. In particular, the depth 200D' tapers proximate the side wall panels 54', 58' from the open front toward the rear of the compartment 46 because of gas flow entering the compartment through the louvered openings 120L. The gas dead zone 200' tapers at generally the same angle 275' at which gas flows from the louvered openings 120L. Other embodiments may have gas dead zones of different or varying shapes.

As in the gas dead zone 200 of the first embodiment, the gas dead zone 200' is substantially free of moving gas generated by the oven during operation of the oven 20. The gas dead zone 200' acts as a thermal barrier for preventing substantial loss of heat from the heating compartment 46. As a result, there is no need for a door at the front of the compartment, making access to the compartment more convenient for loading and unloading of food.

Referring again to FIG. 12, the second and third arrays A20 and A21 comprise openings 120 of similar size and shape as the openings 120 of the first embodiment. For example, the openings 120 have a diameter of about 0.290 in., a vertical center-to-center spacing of about 0.50 in., and a horizontal center-to-center spacing of about 0.50 in. Varying numbers of arrays may be used, and arrays having different numbers or types of openings and different widths (i.e., different numbers of columns) may be used.

Figure 14:
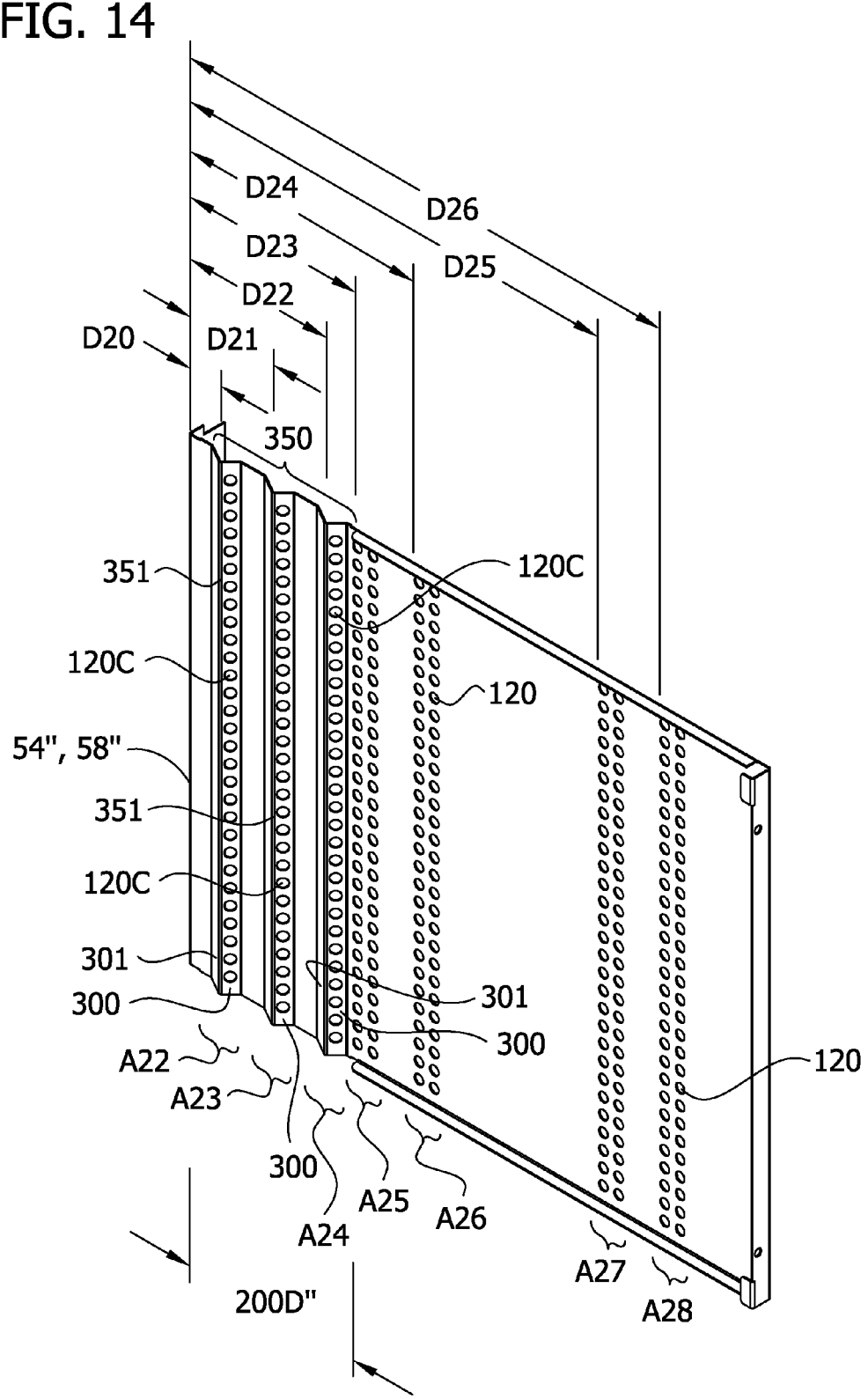
FIG. 14 is a perspective view of a second embodiment of a side wall panel of a heating compartment.

In a fourth embodiment, the oven 20 has a configuration similar to the third embodiment but has different side wall panels. A representative modified side wall panel 54", 58" of the fourth embodiment is illustrated in FIG. 14. Instead of having louvered openings, the modified side wall panel 54", 58" of the fourth embodiment has openings 120C in at least one surface 300 of the side wall panel that is oriented toward the rear of the heating compartment 46. In other words, the openings 120C are provided in one or more surfaces 300 of the side wall panel 54", 58" that face or are angled toward the rear of the heating compartment 46.

The gas flow openings 120, 120C of the panel 54", 58" are arranged in seven vertical arrays A22-A28 spaced at different distances D20-D26 from the front of the heating compartment 46, e.g., 1.5 in., 3.5 in., 5.5 in., 6 in., 8 in., 12 in., and 14 in., respectively. Each array A22-A28 of openings comprises a matrix of columns and rows extending from adjacent the top of the panel 54" to adjacent the bottom of the panel.

In the representative side panel 54", 58" illustrated in FIG. 14, the panel has a corrugated section 350 proximate the open front of the oven 20. The corrugated section 350 comprises ridges 351 extending vertically along the side wall panel 54", 58". Each ridge 351 comprises a surface 300 oriented generally toward the rear of the heating compartment and a surface 301 oriented generally toward the open front of the oven 20. The openings 120C of the first, second, and third arrays A22-A24 are provided on the surfaces 300 oriented toward the rear of the heating compartment 46. The surfaces 300 are oriented so that gas flowing from the openings 120C is directed generally toward the rear of the compartment 46 and toward the centerline 250 extending from the front to the rear of the compartment. Gas flows from the openings 120C at an angle 275" (FIG. 13) less than or equal to seventy-five degrees, more preferably sixty degrees, and more preferably forty-five degrees, with respect to the side wall panels 54", 58". In the illustrated embodiment, the angle 275" is approximately forty-five degrees. Other angles may be used. In addition, the surfaces 300 may be oriented differently so that openings 120C in different ones of the surfaces direct gas flow toward the rear of the compartment 46 at different angles with respect to the side wall panel.

The gas dead zone 200" of this embodiment is similar to the gas dead zone 200' of the third embodiment (i.e., the side wall panels 54", 58" of the fourth embodiment installed in the compartment 46 would produce approximately the same gas dead zone 200' as in the third embodiment). The gas dead zone 200" has a depth 200D" that varies along the side-to-side width of the compartment 46. More specifically, the depth 200D" tapers proximate the side wall panels 54", 58" from the open front toward the rear of the compartment 46 because of gas flow entering the compartment through the openings 120C. The gas dead zone 200" tapers at generally the same angle 275" at which gas flows from the openings 120C. Other embodiments may have gas dead zones of different or varying shapes. As in previous embodiments, the gas dead zone 200" acts as a thermal barrier for preventing substantial loss of heat from the heating compartment 46.

Referring again to FIG. 14, the fourth to seventh arrays A25-A28 may comprise openings 120 of similar size and shape as the openings 120 of the embodiments described above. Varying numbers of arrays may be used, and arrays having different numbers or types of openings and different widths (i.e., different numbers of columns) may be used.

Figure 15:
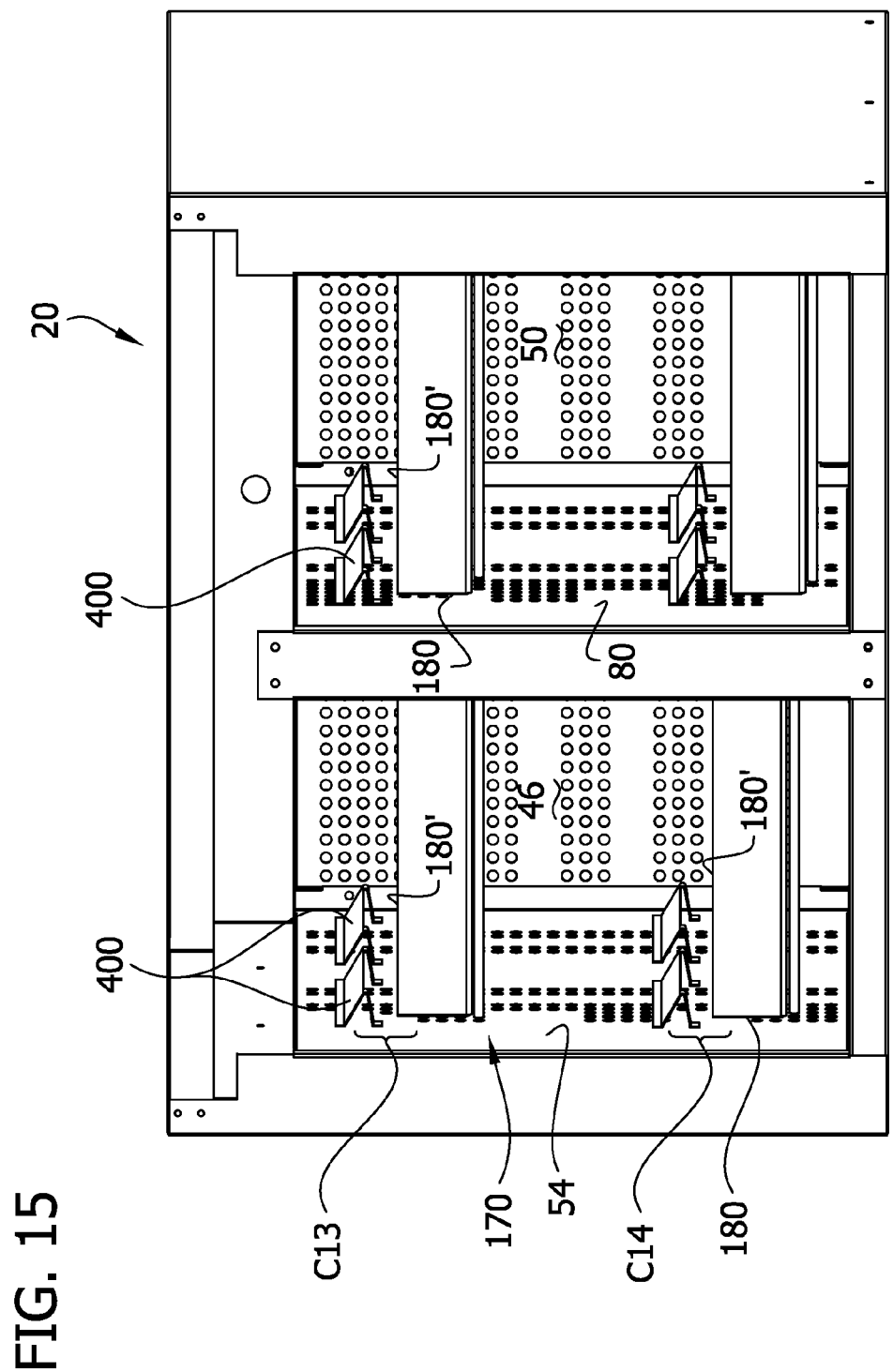
FIG. 15 is a front perspective of the oven.
Figure 16:
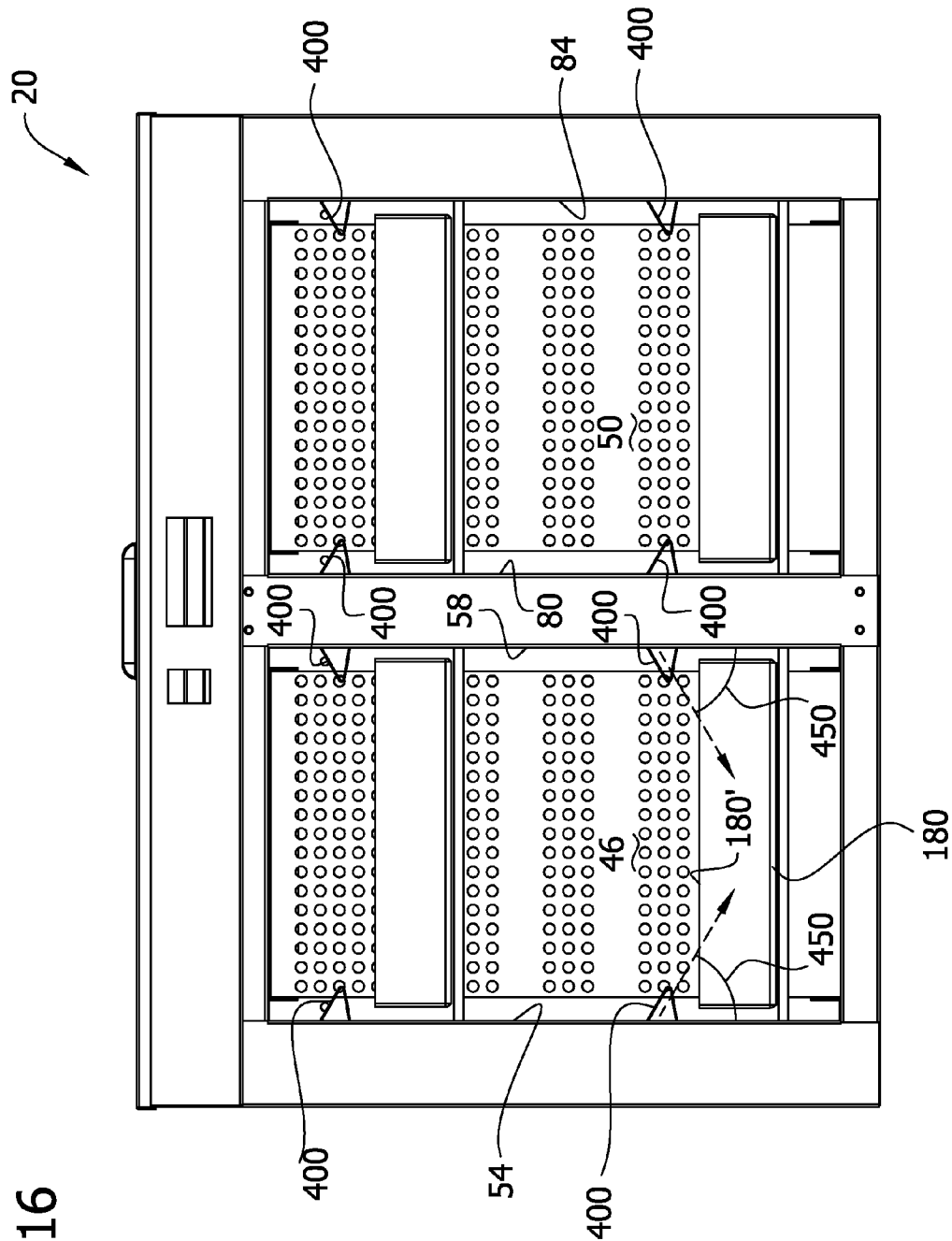
FIG. 16 is a front elevation of the oven of FIG. 15.

In a fifth embodiment, illustrated in FIGS. 15 and 16, the oven 20 has a configuration similar to the first embodiment but includes baffles 400 within the heating compartments 46, 50 on the side wall panels 54, 58, 80, 84 for deflecting gas exiting the holes 120 downward into an open top 180' of a food holder 180 (e.g., tray). The openings 120 in the side wall panels 54, 58, 80, 84 may have various arrangements. In the illustrated arrangement, clusters C13 and C14 of openings 120 on each side wall panel 54, 58, 80, 84 extend along substantially the entire depth of the heating compartments 46, 50. The baffles 400 overhang at least some of the openings 120 to direct gas flowing from those openings into the heating compartment 46 generally downward to contact food within the holder 180. The baffles 400 are desirably positioned vertically within the heating compartments 46, 50 with respect to the support system 170 in contemplation of characteristics (e.g., height, width) of the desired food holders 180 to be used so that gas deflected downward by the baffles 300 is directed from a suitable height and at a suitable angle 450 (FIG. 16) so that the gas flows through the open top of the holder and contacts the food in the holder when the holder is positioned on the support system 170. The angle 450 may be generally between five and seventy-five degrees with respect to the side wall panel. The angle is more desirably between twenty and sixty degrees, and more desirably between forty and fifty degrees. In the illustrated embodiment, the angle 450 is approximately forty-five degrees.

The illustrated baffles 400 extend approximately the entire front-to-rear depth of the heating compartments 46, 50, but baffles of other lengths may be used. In addition other types of baffles may be used. For example, louvered openings may be used to direct flow of gas as desired.

Figure 17:
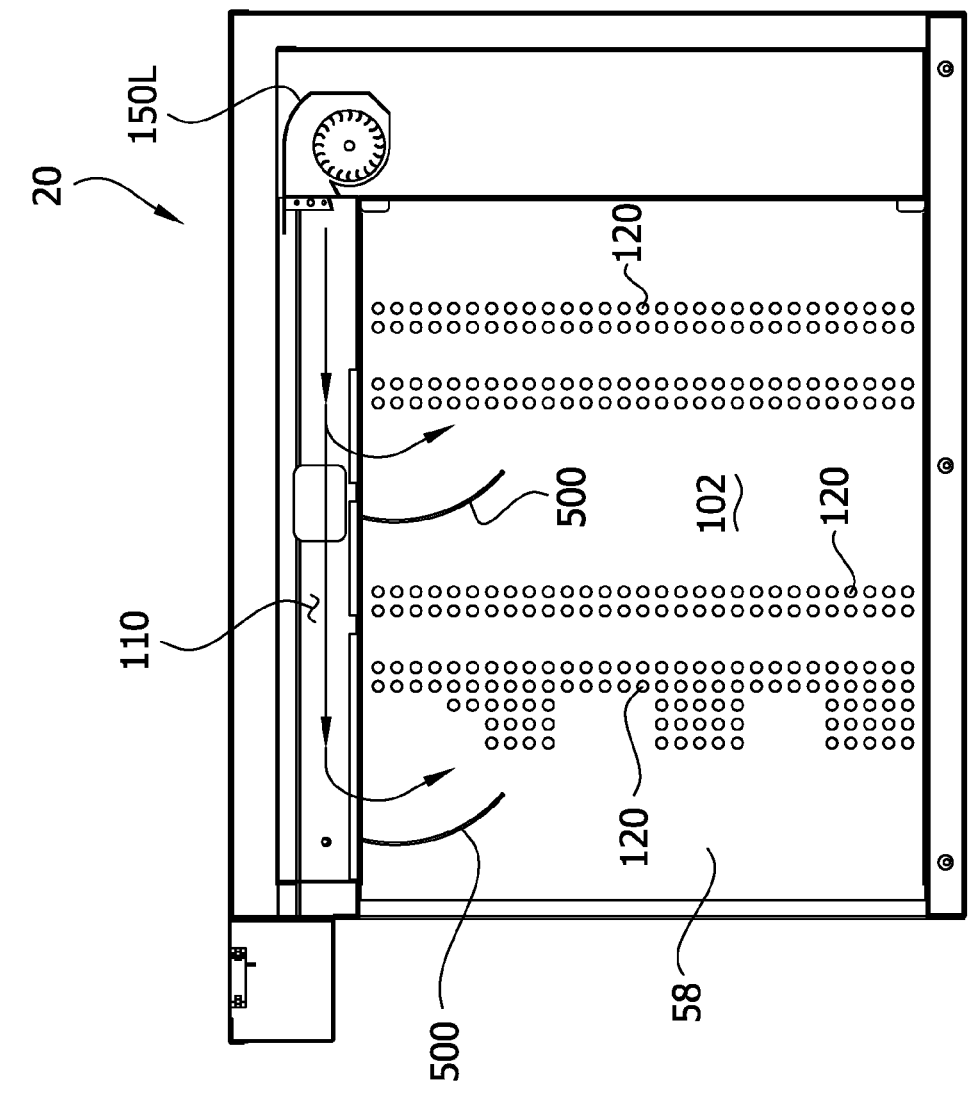
FIG. 17 is a vertical sectional view taken through the oven in a plane extending in front-to-back direction showing the flow of heated air through a heating compartment of the oven.

In a sixth embodiment, illustrated in FIG. 17, the oven 20 again has a configuration similar to the first embodiment but is different in that the oven includes vanes 500 positioned and supported within the left, right, and/or intermediate gas plenums 72, 98, 102 to counteract forward velocity of gas flowing within the plenums to prevent the gas from breaching the gas dead zone 200 in the front of the compartments 46, 50 after the gas flows into the compartments through the openings 120 in the side wall panels 54, 58, 80, 84. FIG. 17 illustrates representative vanes 500 positioned and supported in the intermediate plenum 102.

As explained above with respect to the first embodiment, gas from the left blower 150L travels along the top gas plenum 110, flows into the intermediate gas plenum 102, and then flows into the heating compartment 46 via the openings 120 in the right side wall panel 58. Some gas entering the heating compartment 46 may tend to flow toward the open front of the oven 20 as a result of the gas molecules having residual velocity in that direction from the blower 150L. The vanes 500 desirably substantially counteract residual forward velocity to prevent gas molecules entering the heating compartment 46 from breaching the gas dead zone 200 in the front of the compartment to prevent substantial loss of heat from the heating compartment. Moreover, the vanes 500 may be configured to turn the flow of gas toward the rear of the compartment 46 so that the gas molecules tend to flow toward the rear of the compartment upon entry into the compartment through the openings 120 in the right side wall panel 58.

Gas dead zones as described herein may have different shapes in different embodiments. Although the gas dead zone 200 and the gas dead zones 200' and 200" have generally rectangular and generally trapezoidal horizontal cross-sections, respectively, other gas dead zones may have different horizontal cross-sections. For example, a gas dead zone may have a generally triangular horizontal cross section. In some embodiments, the gas dead zone has the same horizontal cross-section (e.g., rectangular or trapezoidal) over substantially the entire height of the heating compartment 46, 50. However, in other embodiments, the dimensions of the gas dead zone may vary over the height, across the width, and along the depth of the heating compartment 46, 50.

Figure 18:
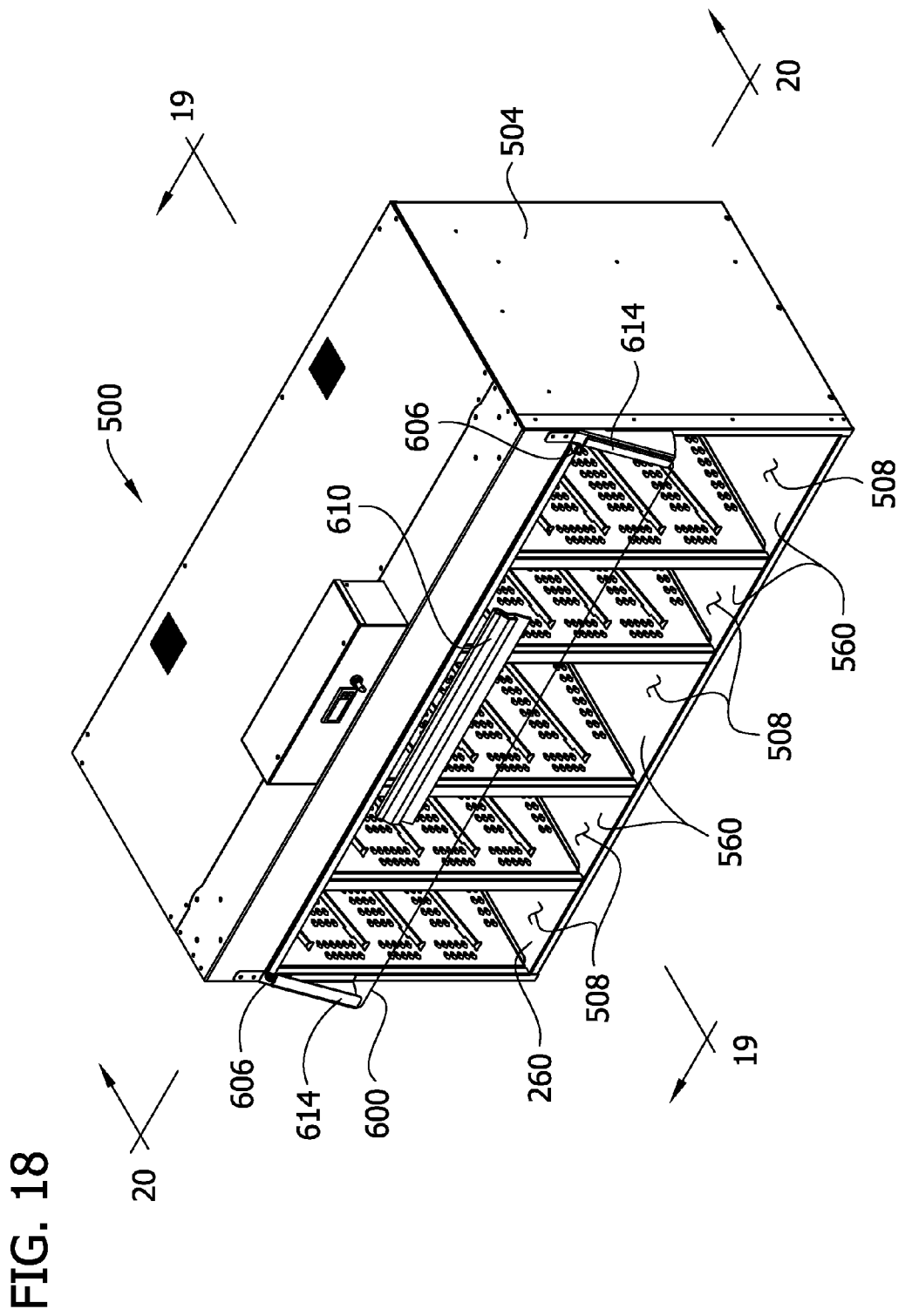
FIG. 18 is a front perspective view of a second embodiment of an oven of this invention.
Figure 19:
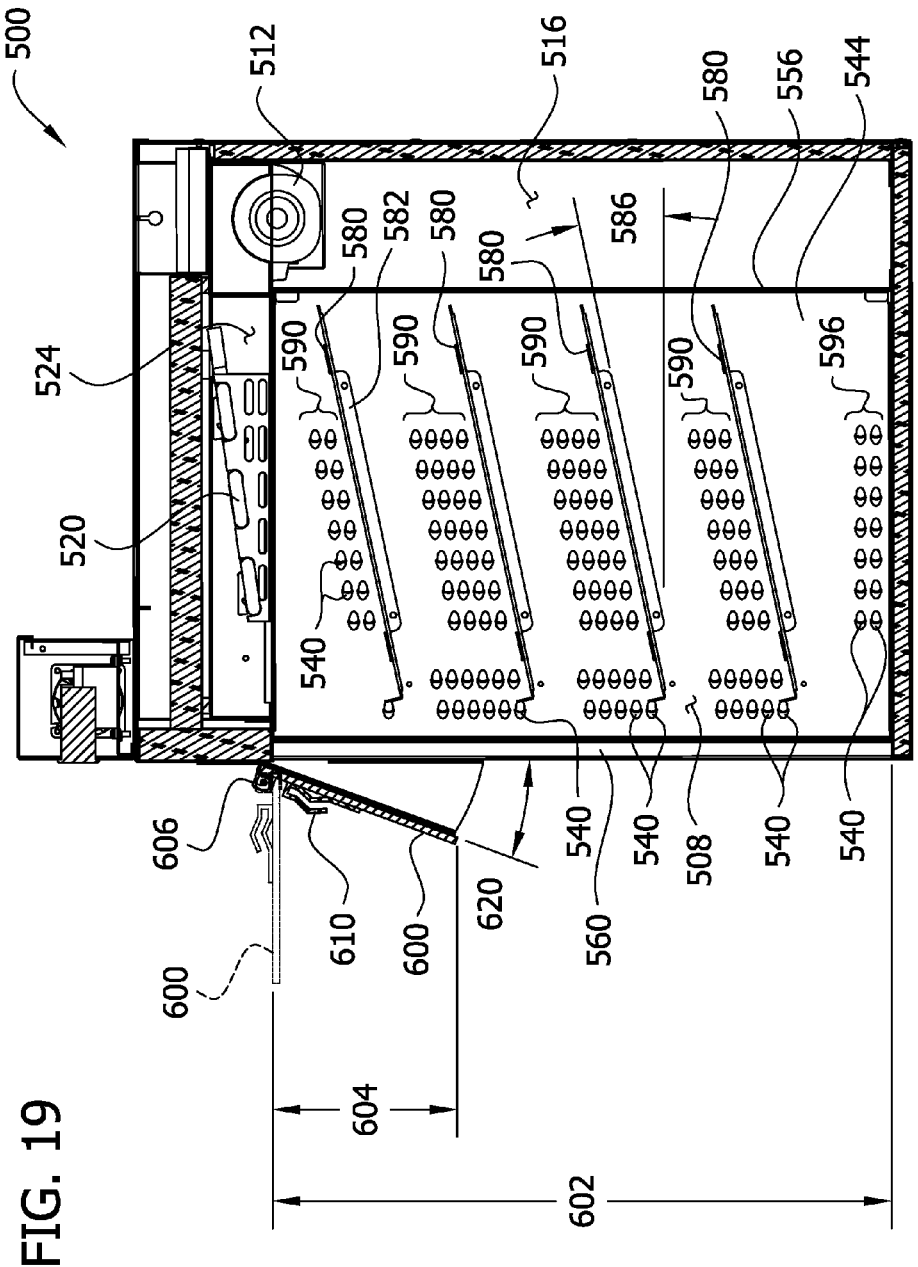
FIG. 19 is a vertical section taken in the plane of 19-19 in FIG. 18.
Figure 20:
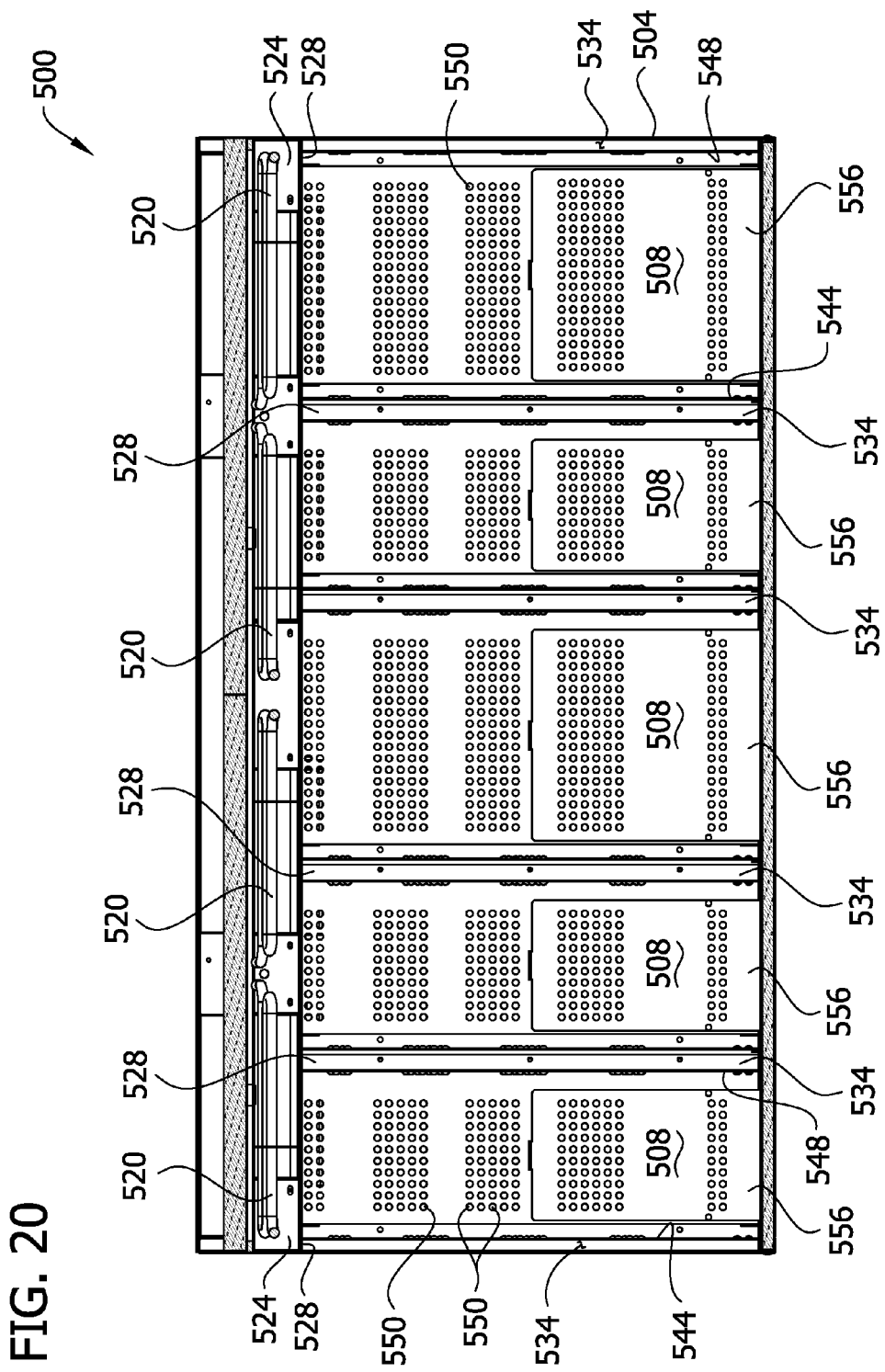
FIG. 20 is a vertical section taken in the plane of 20-20 in FIG. 18.
Figure 21:
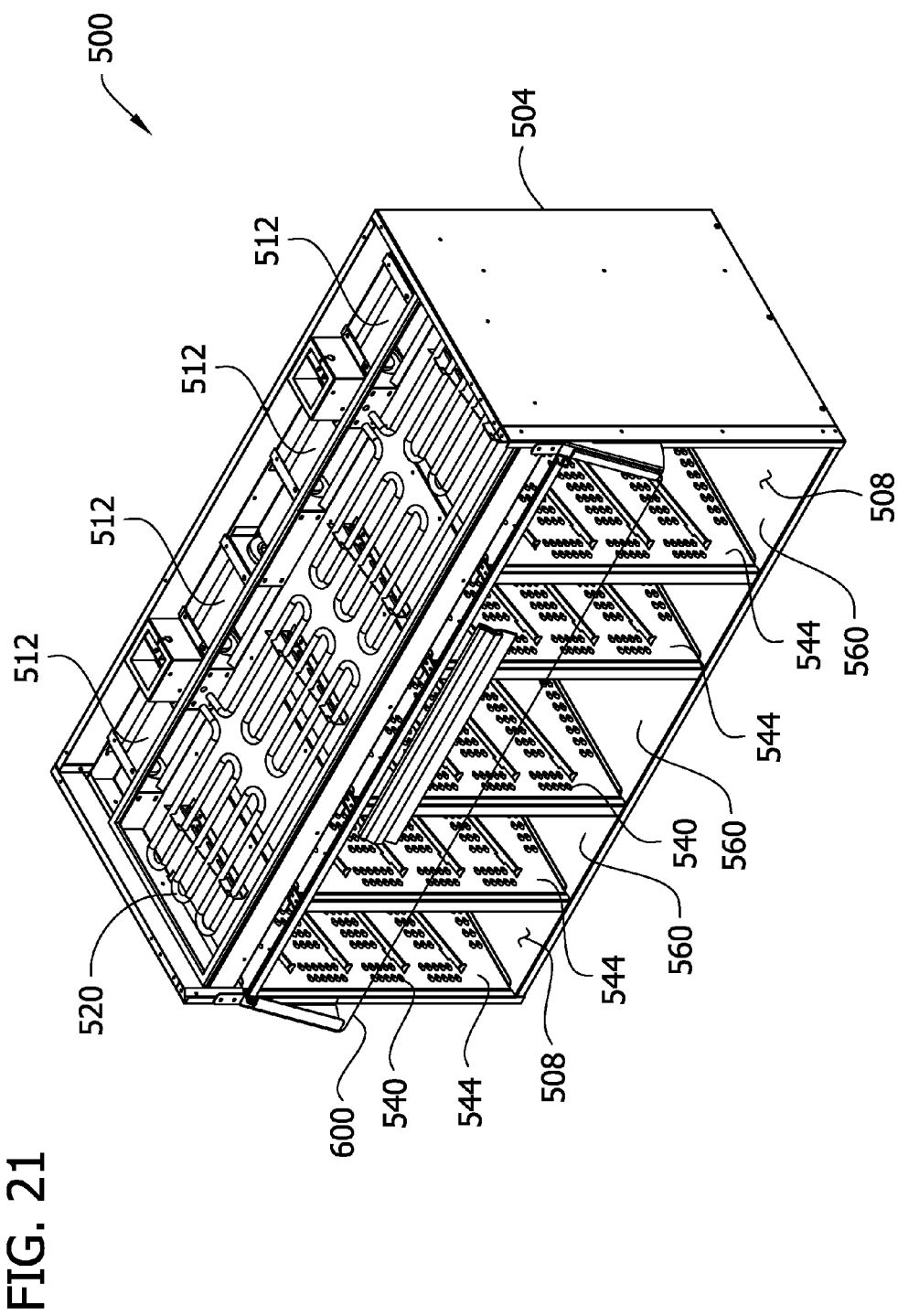
FIG. 21 is a view similar to FIG. 18 but with top portions of the oven removed to show details.
Figure 22:
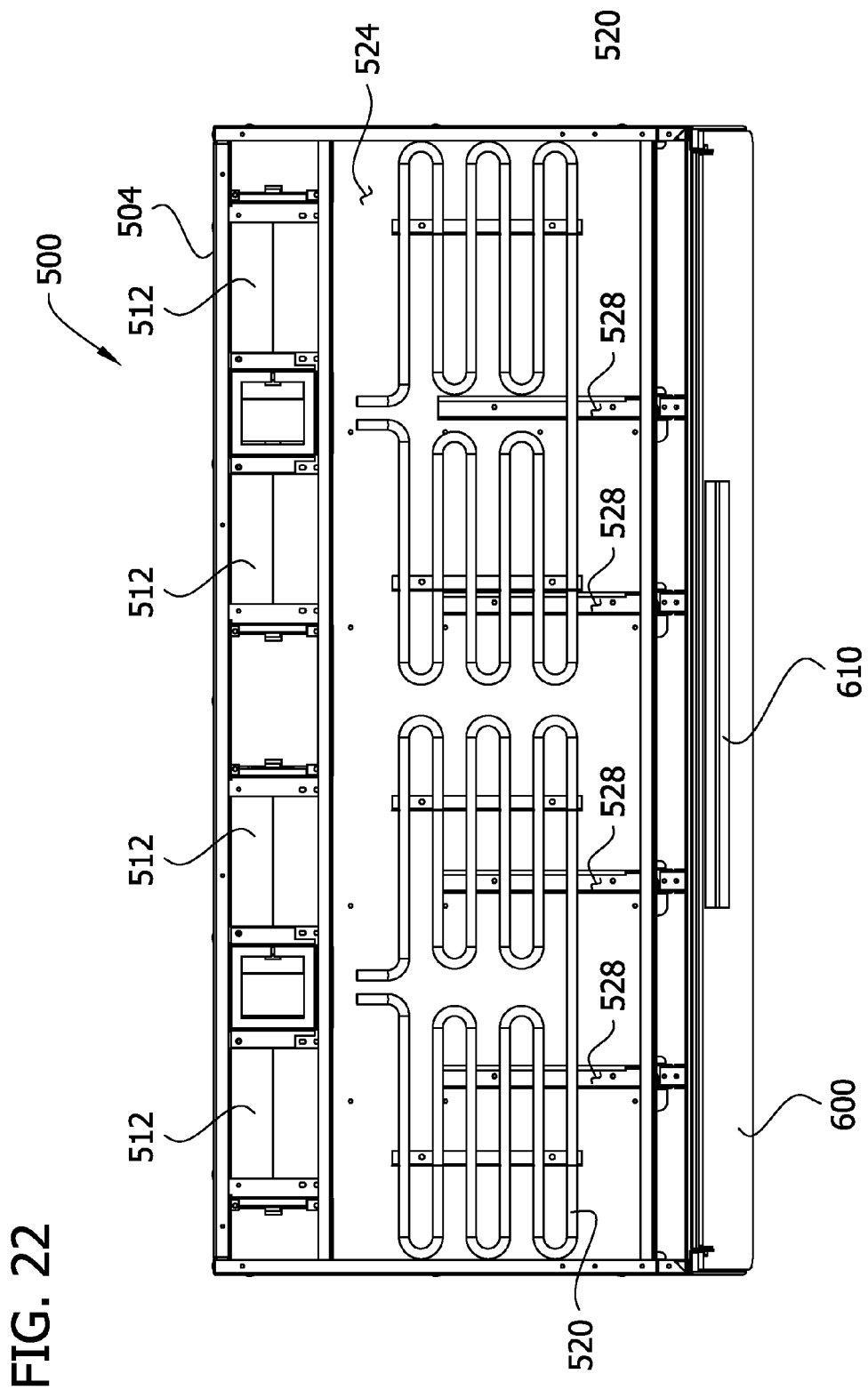
FIG. 22 is a top view of FIG. 20.

FIGS. 18-23 show another embodiment of an air handling unit or oven of this invention, generally designated 500. The oven 500 is similar in construction to the oven 20 of the first embodiment. The oven 500 comprises a housing 504 defining an oven cavity comprising a plurality of side-by-side heating compartments 508. (Five such compartments 508 are shown but this number can vary.) Desirably, each heating compartment has a side-to-side width of no more than about 14 inches. Heated air is circulated through the compartments 508 in much the same manner as in the oven 20 of the first embodiment. As shown in FIGS. 19, 21, and 22, blowers 512 positioned at the upper end of a rear plenum 516 in the oven blow air over electric resistance heaters 520 positioned in an upper plenum 524 of the oven (see FIG. 19). The heated air flows down through openings 528 into plenums 534 at opposite sides of the heating compartments 508 and then into the compartments 508 through gas flow openings 540 in the left and right side walls 544, 548 of the compartments (FIGS. 20-22). Air from the heating compartments 508 is exhausted into the rear plenum 516 through openings 550 in the back walls 556 of the compartments (see FIG. 20).

Figure 23:
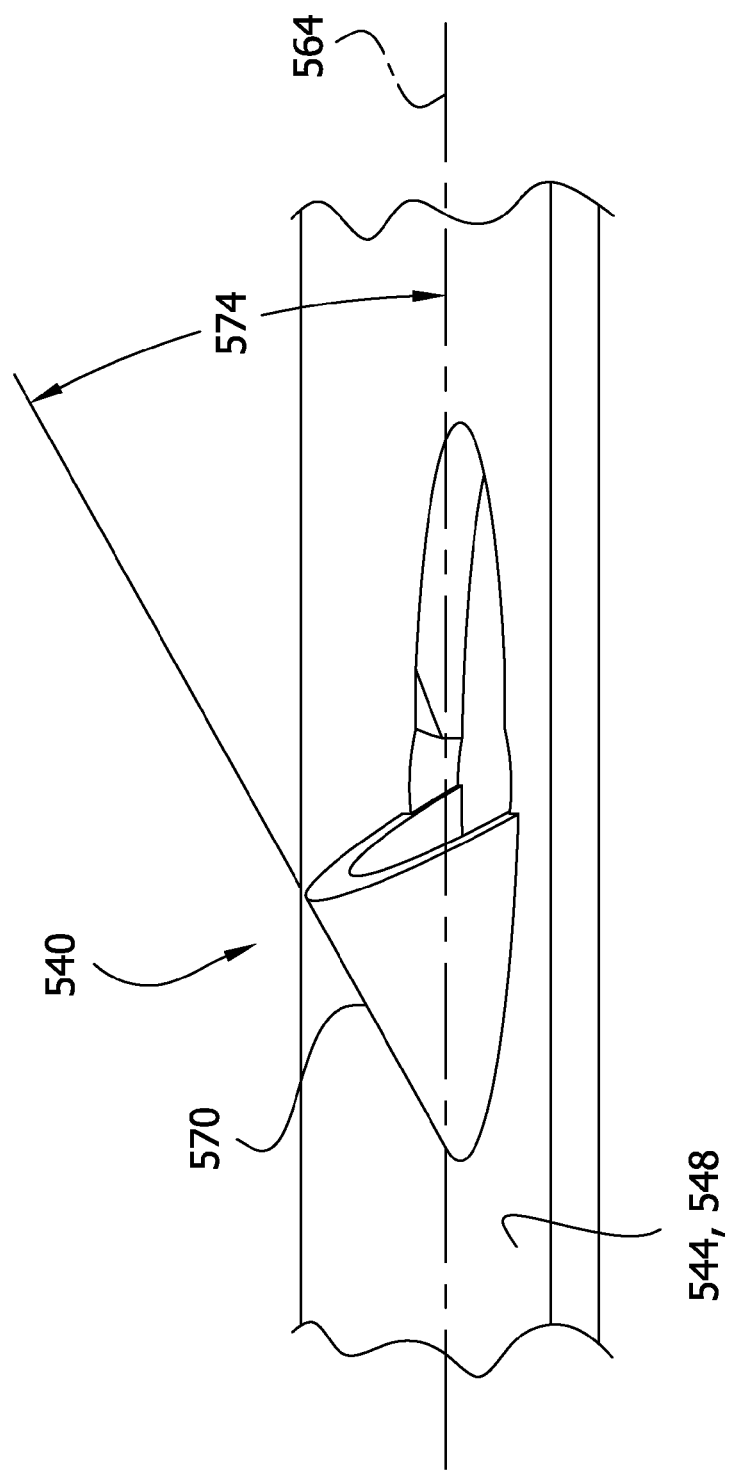
FIG. 23 is an enlarged cross-sectional view of a gas flow opening in a side wall of a heating compartment.

However, the oven 500 differs from the previous embodiments in that it has no dead zone at the open front 560 of each compartment 508. Further, unlike prior art ovens, there is no air curtain at the open front 560 of each compartment. The gas flow openings 540 in the side walls 544, 548 of the compartments are configured such that substantially all of the gas blowing into the heating compartment 508 is directed generally away from the open front 560 of the compartment. FIG. 23 illustrates one such gas flow opening 540 in a respective side wall 544, 548. The opening 540 is generally oval in shape, having a longitudinal axis 564, and comprises an angled nozzle 570 that directs air flowing through the opening at an acute angle 574 in the range of 10-45 degrees (e.g., about 15 degrees) relative to the side wall. Other gas flow opening configurations are possible.

Figure 19A:
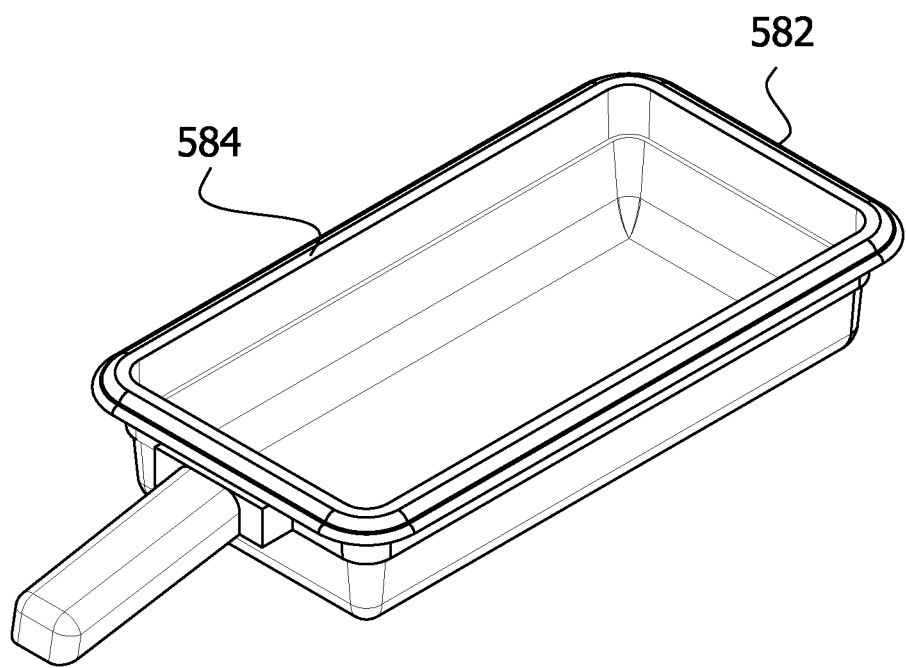
FIG. 19A is a perspective of one embodiment of a tray that can be used in the oven.

Referring to FIGS. 19 and 19A, supports 580 are provided on the side walls 544, 548 of the heating compartments 508 for supporting trays 582 at vertically spaced elevations in the heating compartment. The trays have outwardly projecting peripheral flanges 584 around their open tops. The flanges 584 are dimensioned to rest on the supports 580 such that trays hang down from the supports. Other supporting arrangements are possible. Further, the supports 580 are configured for supporting the trays at an upward inclination toward the back wall 556 of the heating compartment 508. The angle of inclination 586 (e.g., 10-20 degrees) allows a user of the oven to readily observe the contents of the trays.

The gas flow openings 540 are grouped in a plurality of arrays 590 comprising vertical columns of openings and rows of openings 540 extending generally in front-to-back direction with respect to the heating compartment. The arrays 590 are spaced at vertical intervals at locations corresponding to the areas above the supports 580 and the open tops of the trays 582. Further, the arrays 590 are configured to extend generally at the same angle of inclination 586 as the supports 580 and trays 582 (e.g., 10-20 degrees). Although each array 590 as a whole is upwardly inclined toward the back wall 556 of the compartment 508, the longitudinal axis 564 of each individual opening 540 extends generally horizontally. The arrangement is such that heated air discharged through the gas flow openings 540 of each array 590 passes over the top of any tray supported immediately below the array and under the bottom of any tray supported immediately above the array. As a result, food in each tray is uniformly heated from above and below.

Generally horizontal arrays 596 of gas flow openings 540 are provided adjacent the lower ends of the side walls 544, 548 of each heating compartment 508. During operation of the oven 500, heated air flowing through these arrays 596 of openings functions to warm cooler make-up air flowing into the heating compartments 508 via the open fronts 560 of the compartments.

Referring to FIGS. 18 and 19, an air deflector 600 is mounted adjacent the upper end of each heating compartment 508 for deflecting heated air into the heating compartment. In the illustrated embodiment, the air deflector 600 comprises a single rectangular transparent panel (also designated 600) extending across the open fronts 560 of all five heating compartments 508. Alternatively, a separate air deflector can be provided for each compartment. The deflector 600 is pivoted on brackets 606 at the front of the oven housing 504 for movement between a raised position (shown in phantom lines in FIG. 19) to enable removal of one or more trays 582 from a heating compartment or compartments 508 and a lowered operative position (shown in solid lines in FIG. 19) in which heated air rising in the heating compartments is deflected back into the compartments. This deflection reduces the escape of heated air from the oven, thus increasing efficiency and decreasing any negative impact escaping air might have on the surrounding environment. A holder 610 is provided on the deflector for holding a menu, instructions, or other material to be observed by a user of the oven.

Referring to FIG. 19, the open front of each compartment has an overall vertical height represented by the dimension 602. The air deflector 600 is dimensioned such that, when in its lowered position, it has a vertical height represented by the dimension 604. Desirably, the ratio of dimension 604 to 602 is less than one-half, and even more desirably no more than about one-third. As a result, when the deflector 600 is in its lowered position, it extends down over only the upper portion of the open front 560 of each heating compartment 508.

In its lowered position, the air deflector panel 600 desirably rests on support members 614 adjacent opposite sides of the oven housing 504 (FIGS. 18 and 19). These support members 614 support the panel at an acute angle 620 (e.g., 15 degrees) sloping in a forward direction down and away from the open front 560 of each compartment 508. This slope increases the volume of heated gas deflected by the panel back into the heated compartments. In other embodiments, the air deflector 600 may assume a substantially vertical orientation when in its lowered position.

Figure 24:
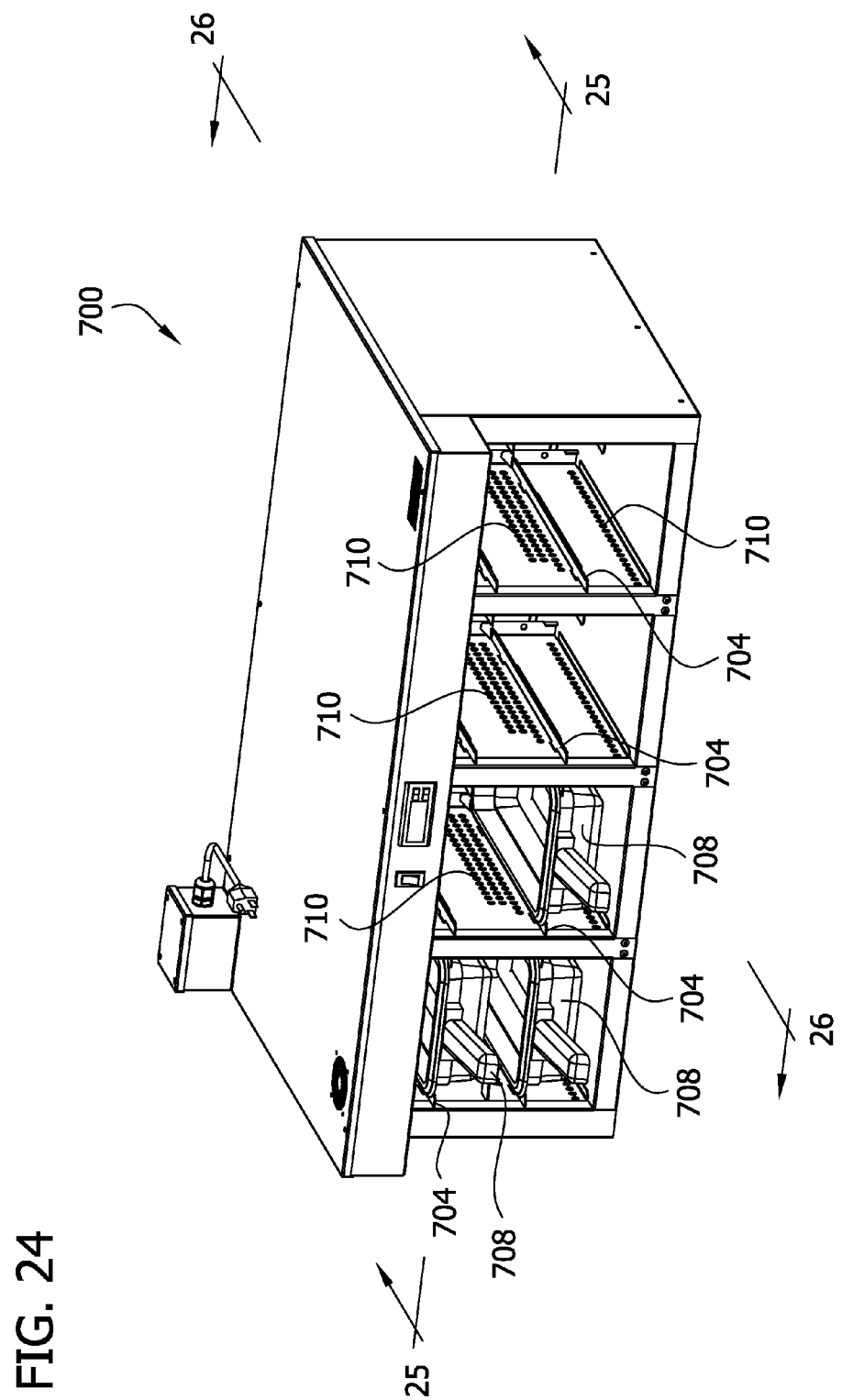
FIG. 24 is a front perspective view of a third embodiment of an oven of this invention.
Figure 25:
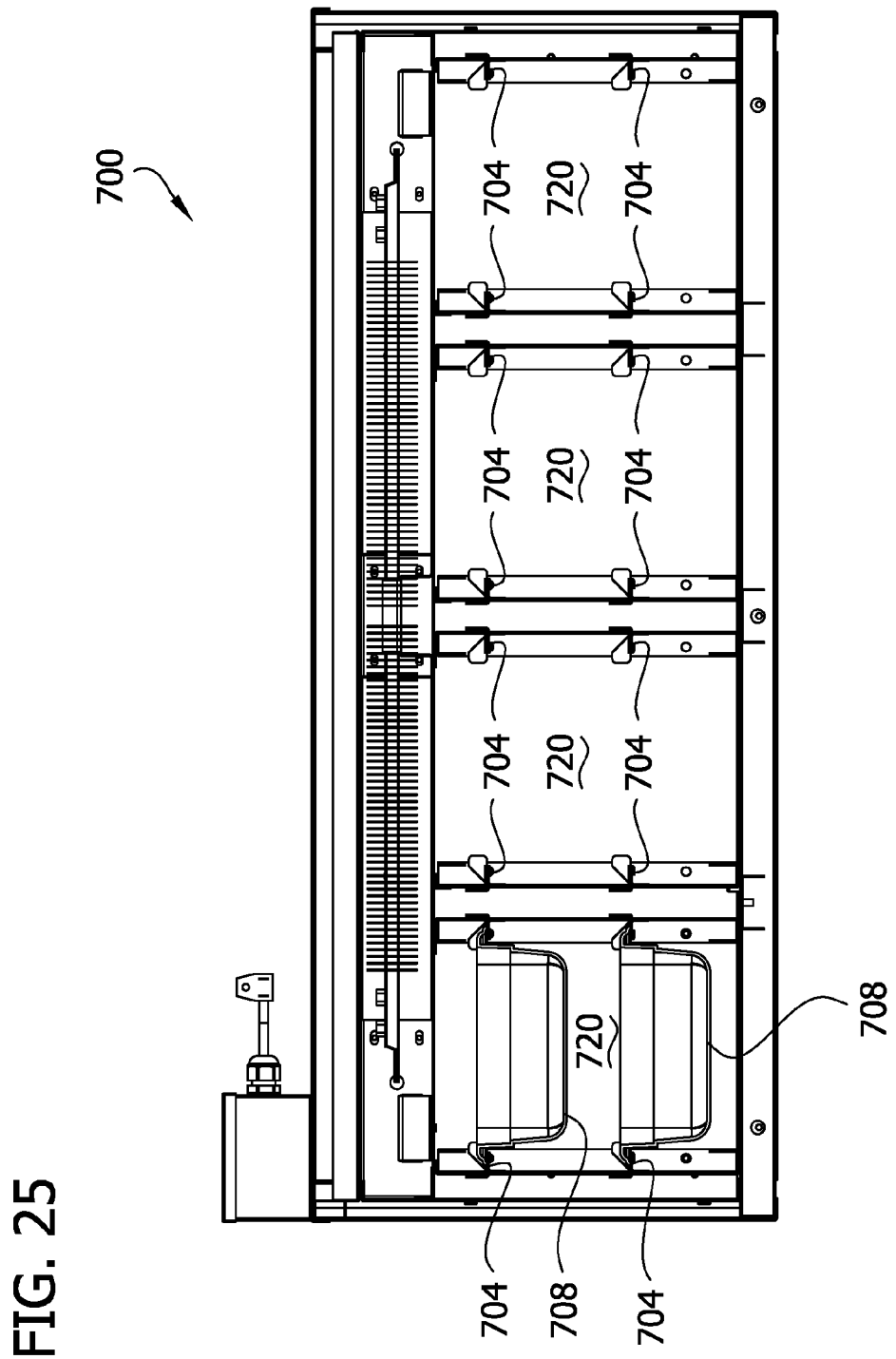
FIG. 25 is a vertical section taken in the plane of 25-25 in FIG. 24.
Figure 26:
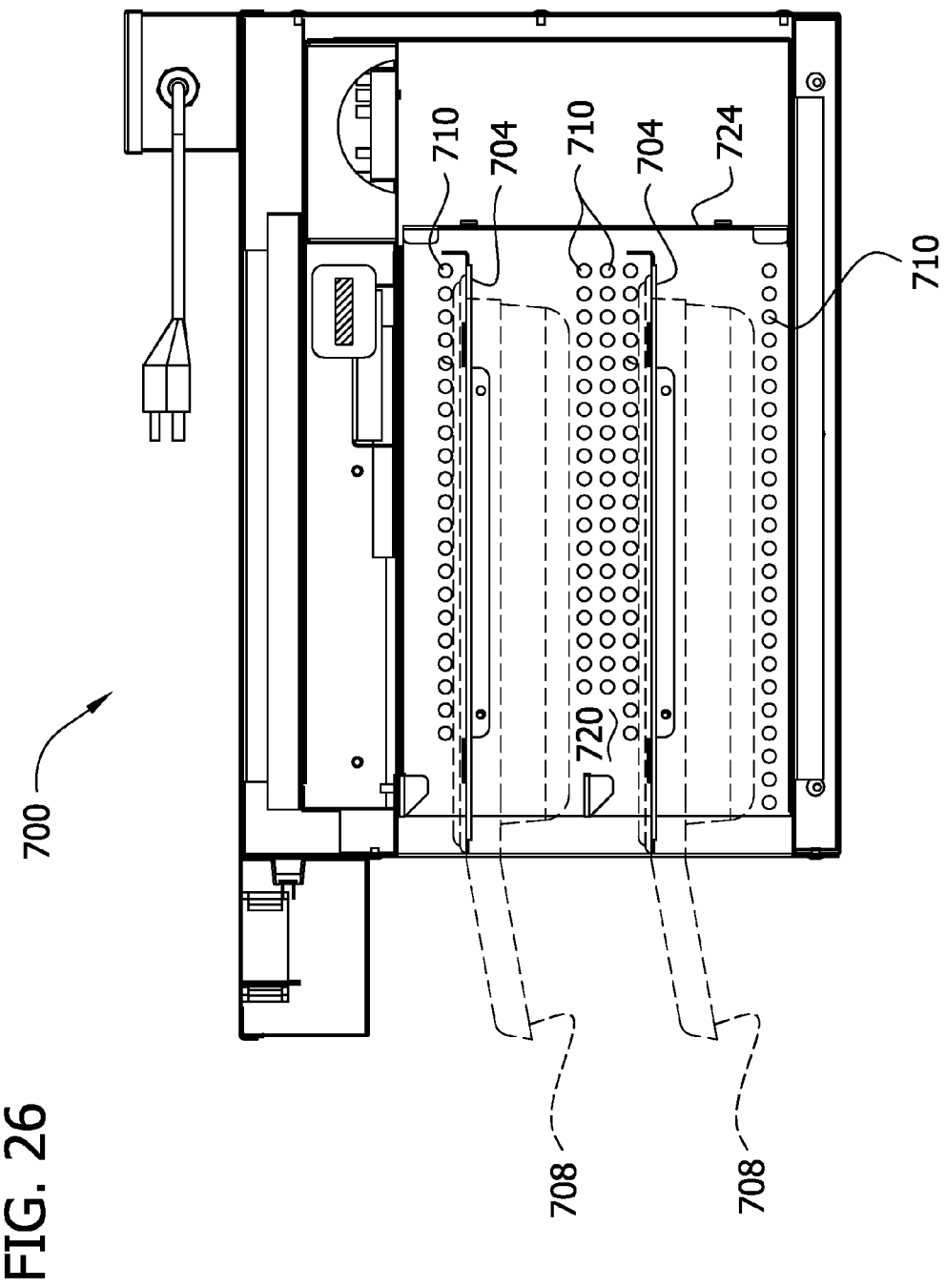
FIG. 26 is a vertical section taken in the plane of 26-26 in FIG. 24.

FIGS. 24-26 show another embodiment of an oven of this invention, generally designated 700. The oven 700 is similar to the oven 20 of the first embodiment. Supports 704 are provided for supporting trays 708 in a generally horizontal orientation (with no substantial upward tilt). Gas flow openings 710 in the side walls of each heating compartment are configured in generally horizontal arrays at locations generally corresponding to the areas above the open tops of the trays 708. Heated gas discharged through the openings 710 of each array 714 flows across the top of any tray 708 immediately below the array and flows across the bottom of any tray immediately above the array. Heated gas exits each heating chamber 720 through openings (not shown) in the back wall 724, as described in previous embodiments.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An oven for heating food, comprising
a housing having a left side, a right side, a top, a bottom, a back, and a front,
an oven cavity inside the housing comprising at least one heating compartment for heating food placed in the compartment,
the heating compartment having a left side wall, a right side wall, a back wall, a top wall, a bottom wall, and an open front, without a door, in open communication with a surrounding environment outside the oven,
gas flow openings in at least one of the left and right side walls,
a blower for blowing gas through the gas flow openings in at least one of the left and right side walls into the heating compartment,
a heater for heating gas blowing into the heating compartment through the gas flow openings, and
wherein the gas flow openings are configured such that substantially all of the gas blowing into the heating compartment is directed generally away from the open front of the compartment.

2. The oven set forth in claim 1, wherein said back wall has gas flow openings for exit of gas from the at least one heating compartment.

3. The oven set forth in claim 2, wherein the heating compartment is a left heating compartment, and wherein the oven further comprises a right heating compartment, the right heating compartment having a left side wall, a right side wall, a back wall, a top wall, a bottom wall, and an open front, without a door, in open communication with a surrounding environment outside the oven, the oven further comprising an intermediate gas plenum between the left and right heating compartments, said intermediate gas plenum having a left wall defined by the right side wall of the left heating compartment and a right side wall defined by the left side wall of the right heating compartment.

4. The oven set forth in claim 3, further comprising a left gas plenum adjacent the left side wall of the left heating compartment, a right gas plenum adjacent the right side wall of the right heating compartment, a back gas plenum adjacent the back walls of the left and right heating compartments, and a top gas plenum adjacent the top walls of the left and right heating compartments, said left and right gas plenums, back gas plenum, top gas plenum, and intermediate gas plenum communicating with one another to define flow paths for circulating gas through said left and right heating compartments.

5. The oven set forth in claim 4, wherein said back gas plenum comprises a left gas flow channel communicating with the left heating compartment and top gas plenum, and a right gas flow channel, separate from the left gas plenum channel, communicating with the right heating compartment and the top gas plenum.

6. The oven set forth in claim 5, wherein said left and right gas flow channels include respective upper and lower ends, and wherein said blower is a left blower located adjacent the upper end of the left gas flow channel, and wherein said oven further comprises a right blower located adjacent the upper end of the right gas flow channel.

7. The oven set forth in claim 6, wherein said heater is a left heater located in the top gas plenum generally above the left heating compartment for heating gas discharged from the left blower, and wherein said oven further comprises a right heater located in the top gas plenum generally above the right heating compartment for heating gas discharged from the right blower.

8. The oven set forth in claim 1, wherein said gas flow openings are located in the left and right side walls of the heating compartment and arranged between the top and bottom walls of the heating compartment such that gas is delivered substantially uniformly into the heating compartment from adjacent the top wall of the heating compartment to adjacent the bottom wall of the heating compartment.

9. The oven set forth in claim 1, wherein said blower operates to deliver heated gas into the heating compartment via said gas flow openings at a velocity sufficient for the moving gas to contact food located midway between the left and right side walls of the compartment.

10. The oven set forth in claim 1, wherein the blower blows gas through the gas flow openings in one of the left and right side walls into the heating compartment, and the gas flow openings in the other of the left and right side walls is for exit of gas from the at least one heating compartment.

11. The oven set forth in claim 1, wherein the heating compartment has a side-to-side width of no more than about 14 inches.

12. The oven set forth in claim 1, further comprising supports in the oven for supporting trays at vertically spaced elevations in the heating compartment, and wherein the gas flow openings are grouped in a plurality of arrays extending generally in front-to-back direction with respect to the heating compartment, said arrays being spaced at vertical intervals corresponding to said elevations at which the trays are supported such that heated gas discharged through the gas flow openings of an array flows across the top of any tray immediately below the array and flows across the bottom of any tray immediately above the array.

13. The oven set forth in claim 12, wherein said supports are configured for supporting the trays at an angle of inclination that extends upward and rearward in the heating compartment, and wherein the gas flow openings of the arrays are arranged with respect to one another to provide each array with a shape extending generally at said angle of inclination upward and rearward in the heating compartment.

14. The oven set forth in claim 1, further comprising an air deflector at the top of the open front of the heating compartment for deflecting heated air into the heating compartment, said air deflector being movable between a lowered operative position and a raised position.

15. The oven set forth in claim 14, wherein the air deflector in its lowered position extends down over only an upper portion of the open front of the heating compartment.

16. The oven set forth in claim 14, wherein the air deflector comprises a transparent panel extending across the open front of the heating compartment, and at least one support for supporting the panel in its lowered operative position in which the panel slopes down and forward away from the open front of the compartment.

17. An oven for heating food, comprising
- a housing having a left side, a right side, a top, a bottom, a back, and a front,
- an oven cavity inside the housing comprising at least one heating compartment for heating food placed in the compartment,
- the heating compartment having a left side wall, a right side wall, a back wall, a top wall, a bottom wall, and an open front, without a door, in open communication with a surrounding environment outside the oven,
- gas flow openings in at least one of the left and right side walls,
- a blower for blowing gas through the gas flow openings in at least one of the left and right side walls into the heating compartment,
- a heater for heating gas blowing into the heating compartment through the gas flow openings, and
- a movable air deflector at the top of the open front of the heating compartment for deflecting heated air into the heating compartment,
- said air deflector being movable between a lowered operative position and a raised position, and
- said air deflector in its lowered position extending down over only an upper portion of the open front of the heating compartment.

18. The oven set forth in claim 17, wherein the air deflector comprises a panel extending across the open front of the heating compartment, and a mechanism for supporting the panel in its lowered operative position in which the panel slopes down and forward away from the open front of the compartment.

19. An oven for heating food, comprising
- a housing having a left side, a right side, a top, a bottom, a back, and a front,
- an oven cavity inside the housing comprising at least one heating compartment for heating food placed in the compartment,
- the heating compartment having a left side wall, a right side wall, a back wall, and an open front, without a door, in open communication with a surrounding environment outside the oven,
- gas flow openings in at least one of the left and right side walls,
- a blower for blowing gas through said gas flow openings in at least one of the left and right side walls into the heating compartment,
- a heater for heating gas blowing into the heating compartment through said gas flow openings in at least one of the left and right side walls,
- gas flow openings in the back wall of the heating compartment, and
- wherein gas blows into the heating compartment via said gas flow openings in at least one of the left and right side walls and gas exhausts from the heating compartment via said gas flow openings in the back wall of the heating compartment.

* * * * *